(12) United States Patent
Lee

(10) Patent No.: US 8,200,717 B2
(45) Date of Patent: Jun. 12, 2012

(54) REVISION OF MULTIMEDIA CONTENT

(75) Inventor: Hsieh-Te Lee, Taoyuan (TW)

(73) Assignee: Cyberlink Corp., Shindian, Taipei (TW)

( * ) Notice: Subject to any disclaimer, the term of this patent is extended or adjusted under 35 U.S.C. 154(b) by 358 days.

(21) Appl. No.: 12/389,620

(22) Filed: Feb. 20, 2009

(65) Prior Publication Data
US 2010/0228793 A1    Sep. 9, 2010

(51) Int. Cl.
G06F 17/30    (2006.01)
(52) U.S. Cl. ........................ 707/805; 725/118
(58) Field of Classification Search ................. 707/736, 707/741, 750, 999.003, 999.005, 805; 704/9; 715/231, 716, 200, 201, 234, 255; 705/51; 717/140; 709/203, 227; 386/240; 725/118
See application file for complete search history.

(56) References Cited

U.S. PATENT DOCUMENTS

| 6,314,574 | B1  |   | 11/2001 | Chan |  |
|---|---|---|---|---|---|
| 7,392,481 | B2 | * | 6/2008 | Gewickey et al. | 715/716 |
| 7,480,442 | B2 | * | 1/2009 | Girgensohn et al. | 386/241 |
| 7,689,510 | B2 | * | 3/2010 | Lamkin et al. | 705/51 |
| 7,751,628 | B1 | * | 7/2010 | Reisman | 382/232 |
| 7,751,682 | B2 | * | 7/2010 | Nagamatsu | 386/241 |
| 7,779,097 | B2 | * | 8/2010 | Lamkin et al. | 709/223 |
| 7,807,916 | B2 | * | 10/2010 | Georges | 84/609 |
| 2002/0046176 | A1 |   | 4/2002 | Seo et al. |  |
| 2005/0240909 | A1 | * | 10/2005 | Tersigni | 717/140 |
| 2006/0159109 | A1 | * | 7/2006 | Lamkin et al. | 370/401 |
| 2007/0081798 | A1 |   | 4/2007 | Peng et al. |  |
| 2007/0168376 | A1 |   | 7/2007 | Luitjens et al. |  |
| 2008/0101191 | A1 |   | 5/2008 | Taylor et al. |  |
| 2010/0136958 | A1 | * | 6/2010 | Chandra et al. | 455/414.3 |
| 2010/0228793 | A1 | * | 9/2010 | Lee | 707/805 |
| 2010/0319045 | A1 | * | 12/2010 | Lee | 725/118 |

* cited by examiner

Primary Examiner — Jean M Corrielus
(74) Attorney, Agent, or Firm — Thomas, Kayden, Horstemeyer & Risley, LLP

(57) ABSTRACT

A system and method for revision of multimedia content is provided. For example, in one embodiment, among others, a computer readable medium comprises instructions for revising a multimedia content. The multimedia content includes a first server multimedia content and an optical disc multimedia content. The instructions are executable on a computer and control the computer to perform retrieving, using an optical disc drive, a first association content included in an instructional content stored on an optical disc. The optical disc multimedia content includes the instructional content. The instructions further control the computer to perform importing the first server multimedia content from a first server according to the retrieved first association content. The first server multimedia content is a previously-authored content. The instructions further control the computer to perform updating the first server multimedia content and exporting the updated first server multimedia content.

20 Claims, 19 Drawing Sheets

REVISION OF MULTIMEDIA CONTENT

CROSS-REFERENCE TO RELATED APPLICATIONS

This application is related to the copending U.S. Utility application entitled, "Production of Multimedia Content," having Ser. No. 12/485,198, filed Jun. 16, 2009.

TECHNICAL FIELD

Embodiments disclosed herein are generally related to multimedia and, more particularly, are related to the revision of multimedia content.

COPYRIGHT NOTICE

A portion of the disclosure of this patent document contains material which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

Producing movies was at one time thought of as a task only performed by professional studios. However, advances in computing hardware and software technology have enabled amateurs and non-professionals to produce their own movies at home. For example, amateurs or non-professionals may record a video using a personal digital camcorder and transfer the recorded video to a personal computer. The personal computer is used to manipulate the recorded video to create a home movie. As a further example, musicians can record, manipulate, and mix audio in a digital format to create new songs using a personal computer. The songs or home movies are stored on the personal computer or on an optical disc. Optical discs such as compact discs or digital video discs are popular storage media for video and/or audio bitstreams. Current generations of optical disc media such as blue-ray discs and high definition digital video discs can even offer higher data storage capacities.

SUMMARY

Embodiments described in the present disclosure provide revision of multimedia content. Briefly described, in one embodiment, among others, a computer readable medium comprises instructions for revising a multimedia content. The multimedia content includes a first server multimedia content and an optical disc multimedia content. The instructions are executable on a computer and control the computer to perform retrieving, using an optical disc drive, a first association content included in an instructional content stored on an optical disc. The optical disc multimedia content includes the instructional content. The instructions further control the computer to perform importing the first server multimedia content from a first server according to the retrieved first association content. The first server multimedia content is a previously-authored content. The instructions further control the computer to perform updating the first server multimedia content and exporting the updated first server multimedia content.

Also provided, in another embodiment, is a method for revising a multimedia content, and the multimedia content includes a first server multimedia content and an optical disc multimedia content. The method includes retrieving a first association content from the instructional content stored on an optical disc; importing the first server multimedia content from a first server according to the retrieved first association content; updating the first server multimedia content; and exporting the updated first server multimedia content to the first server.

Other systems, methods, features, and advantages of embodiments described in the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the various embodiments described in the present disclosure. Moreover, in the drawings, like reference numerals designate corresponding parts throughout the several views.

DETAILED DESCRIPTION

The following disclosure describes a system and/or method for revising multimedia content. As a nonlimiting example, a user may have created a home movie and desires to revise it. Portions of the home movie are stored on an optical disc (such as a HD DVD or a BD-Live disc) and other portions are stored on a server. When the optical disc is played on a device having an Internet connection, both the content stored on the optical disc and the server can be viewed. The optical disc includes instructions that cause the content stored on the server to be downloaded over the Internet when the optical disc is played.

The user can revise the home movie using software on a computer. The software can be used to add new content or change the content stored on the server. Then, when the optical disc is played, the new or changed content stored on the server can be viewed as part of the revised home movie. The software can enable a user to import video clips from a digital camcorder and/or new audio clips from an audio recorder. Then, the user can select the clips to be uploaded to the server, and the clips will be exported to the server. The user can also use the software to download the content stored on the server and to edit or replace it. The user can also revise the home movie by adding or modifying other content such as menus, subtitles or hyperlinks.

Also, in this nonlimiting example, the user can revise the home movie by modifying the content stored on the optical disc or adding to it. Then the new or modified content can be burned onto the optical disc, if the optical disc is rewriteable, or burned onto a new optical disc. The software can also tell the user that a new optical disc should be inserted in the computer, if the disc that has already been inserted is not rewriteable.

Figure 1A:
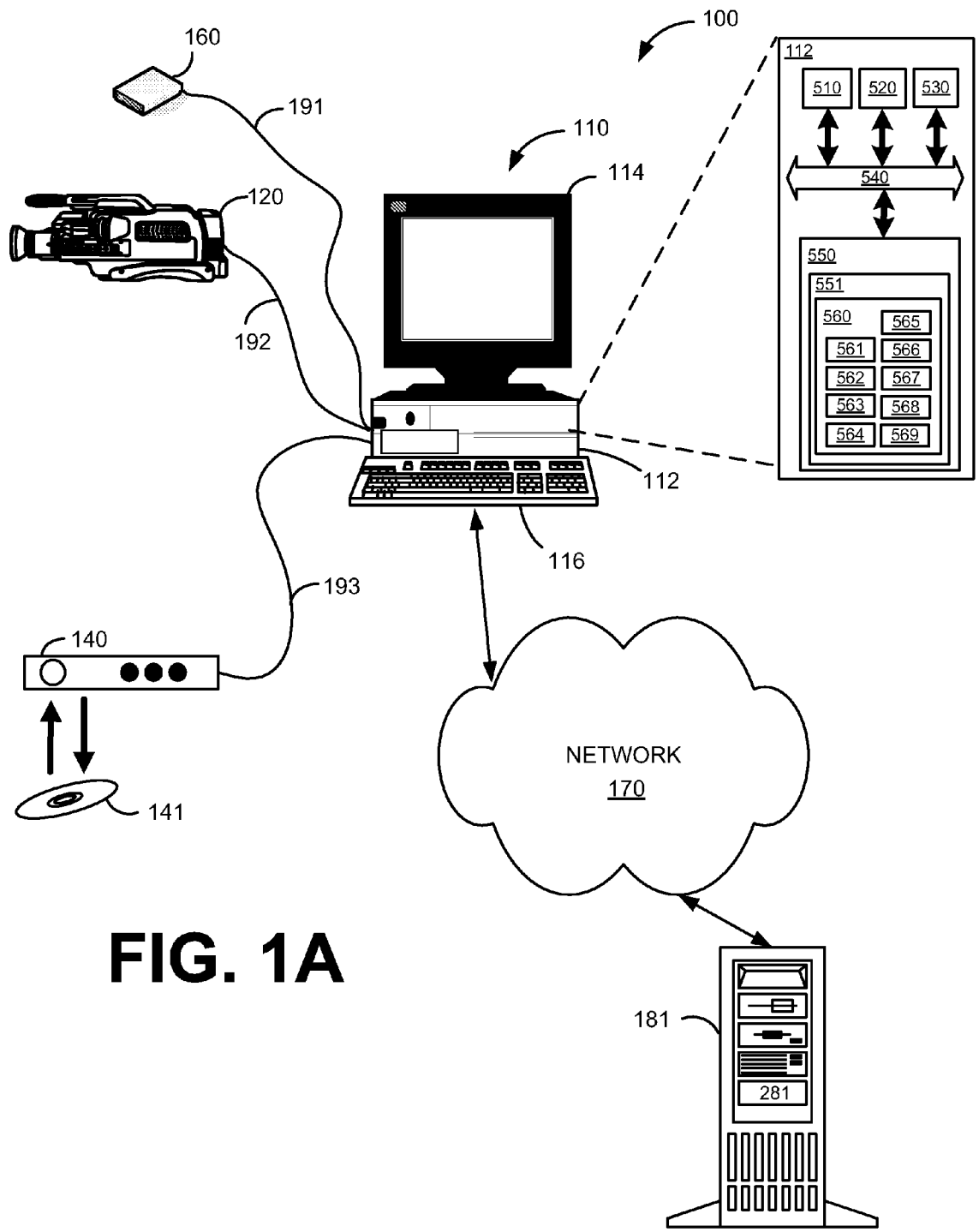
FIG. 1A illustrates a diagram of a first embodiment of a system for revising multimedia content.

FIG. 1A illustrates a diagram of a first embodiment of a system 100 for revising multimedia content. In FIG. 1A, the system 100 for revising multimedia content includes a personal computer 110. The personal computer 110 includes a computing device 112, a display 114, and a user input device 116. In the embodiment illustrated in FIG. 1A, the user input device 116 is a keyboard. Other embodiments may include additional or different user input devices such as a mouse, touchscreen, and/or one or more of a variety of other devices capable of providing an input to a computing device 112. The display 114 and the user input device 116 are coupled to the computing device 112. The computing device 112 includes a memory 550 that stores an operating system 551 as well as an application specific software 560 including executable modules 561, 562, 563, 564, 565, 566, 567, 568, and 569. The computing device 112 will be discussed in further detail below with respect to FIG. 5.

In the embodiment shown in FIG. 1A, a video recorder 120 is coupled to the personal computer 110 via a cable 192. The video recorder 120 may, for example, be a digital camcorder or webcam which records video content and/or audiovisual content in a variety of digital formats. It should be noted that the video content is in any of a number of formats including, but not limited to, Moving Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), or any number of other digital video formats. The video content is transferred from the video recorder 120 to the personal computer 110 using the cable 192.

Additionally, in the embodiment illustrated in FIG. 1A, an audio recorder 160 is coupled to the personal computer 110 via a cable 191. The audio recorder 160 may, for example, be a digital audio recorder that includes a microphone and a memory. The audio recorder 160 may record audio content in one of variety of common digital formats including, but not limited to, an MPEG Audio Layer III (MP3), an MPEG Audio Layer II (MP2), Waveform Audio Format (WAV), or Windows Media Audio (WMA), for example. The audio content is transferred from the audio recorder 160 to the personal computer 110 over the cable 191.

An optical disc drive 140 is coupled to the personal computer 110 as well, and the optical disc drive 140 can receive and read an optical disc 141. The optical disc drive 140 is coupled to the computing device 112 by a cable 193. The optical disc drive 140 reads and/or imports content from the optical disc 141 and sends the content to the personal computer 110 over the cable 193. The optical disc drive 140 can also embed or burn content onto the optical disc 141, if the optical disc 141 is writeable. The content burned onto the optical disc 141 is in the form of an optical disc multimedia bitstream.

In the embodiment illustrated in FIG. 1A, cables 191, 192, 193 couple the audio recorder 160, the video recorder 120, and the optical disc drive 140, respectively, to the personal computer 110. The cables 191, 192, 193 are any number of common computer interface cables, such as, but not limited to Category-5 (CAT-5), IEEE-1394 High Performance Serial Bus (Firewire), Universal Serial Bus (USB), a serial connection, or a parallel connection. In other embodiments, the at least one of the devices is coupled to the personal computer 110 over optical fiber, a wireless connection, or other communication path.

The optical disc 141 is a magneto-optical disc, a blue-ray disc (BD), a blue-ray disc rewritable (BD-RE), a blue-ray disc write-once (BD-R), a blue-ray disc Live (BD-Live), a high-definition digital video disc (HD DVD), a high-definition digital video disc rewritable (HD DVD-RW), a high-definition digital video disc random access memory (HD DVD-RAM), a high-definition digital video disc recordable (HD DVD-R), a digital video disc (DVD), a digital video disc rewritable (DVD-RW), a digital video disc rewritable (DVD+RW), a digital video disc recordable (DVD-R), a digital video disc once-writeable (DVD+R), a digital video disc random access memory (DVD-RAM), a holographic versatile disc, a universal media disc, a versatile multi-layer disc, an enhanced versatile disc (EVD), a compact disc (CD), a compact disc recordable (CD-R), or a compact disc rewritable (CD-RW).

In some embodiments, other devices storing content are coupled to, and/or are in communication with, the personal computer 110. For example, these devices may include digital cameras, scanners, personal digital assistants (PDAs), speakers, cellular phones, microphones, printers, and/or one or more of a variety of other devices. Further, in some embodiments, fewer devices than those illustrated are coupled to, and/or are in communication with, the personal computer 110.

In the embodiment illustrated in FIG. 1A, the personal computer 110 forms a node on a network 170. The network 170 may include a Public Switched Telephone Network (PSTN), a Mobile Telephone Network, the Internet, a Local Area Network (LAN), a Wide Area Network (WAN), and/or other networks. Also, content, including a first server multimedia content 281, which is previously-authored, and/or a source content, can be read and/or imported from the first server 181 over the network 170 to the personal computer 110. Further, content is exported to the first server 181 over the network 170, as well. The connection between the first server 181 and the personal computer 110 is any number of standard networking connections, such as, but not limited to a CAT-5, Firewire, Ethernet or wireless connection.

Figure 1B:
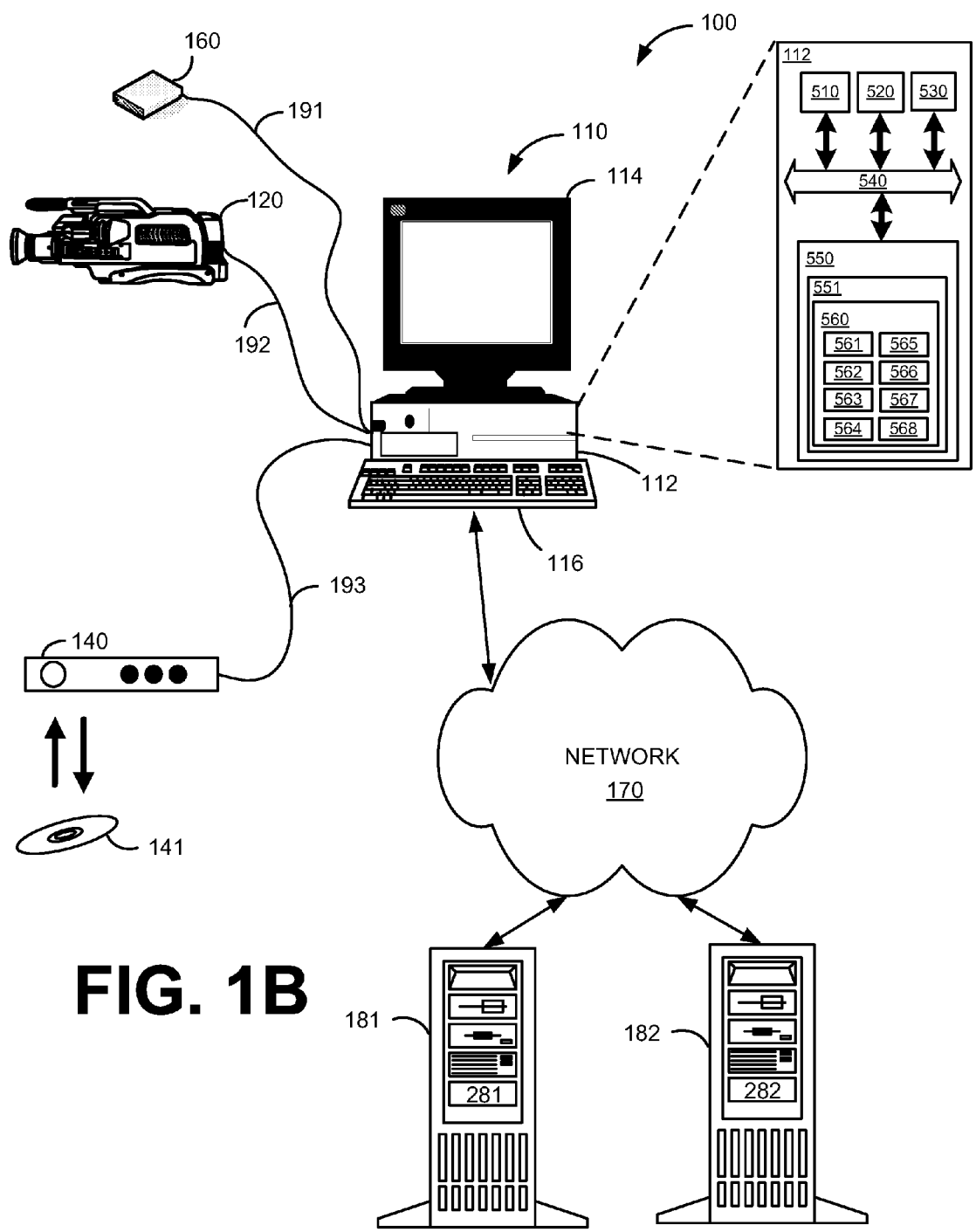
FIG. 1B illustrates a diagram of a second embodiment of a system for revising multimedia content.

FIG. 1B illustrates a diagram of a second embodiment of a system 100 for revising multimedia content. It may be useful to store content on more than one server for redundancy purposes or for additional space, for example. To that end, in addition to the features depicted in FIG. 1A, the embodiment of a system 100 for revising multimedia content illustrated in FIG. 1B also includes a second server 182 coupled to, and/or in communication with, the personal computer 110 over the network 170. Also, content can be read, exported and/or imported to and from the second server 182 over the network 170 to the personal computer 110 in the form of a server multimedia bitstream. The connection between the second server 182 and the personal computer 110 is any number of standard networking connections, such as, but not limited to a CAT-5, Firewire, ethernet or wireless connection. Finally, various components of embodiments reside on the computing device 112, and will be discussed in further detail herein.

Figure 2A:
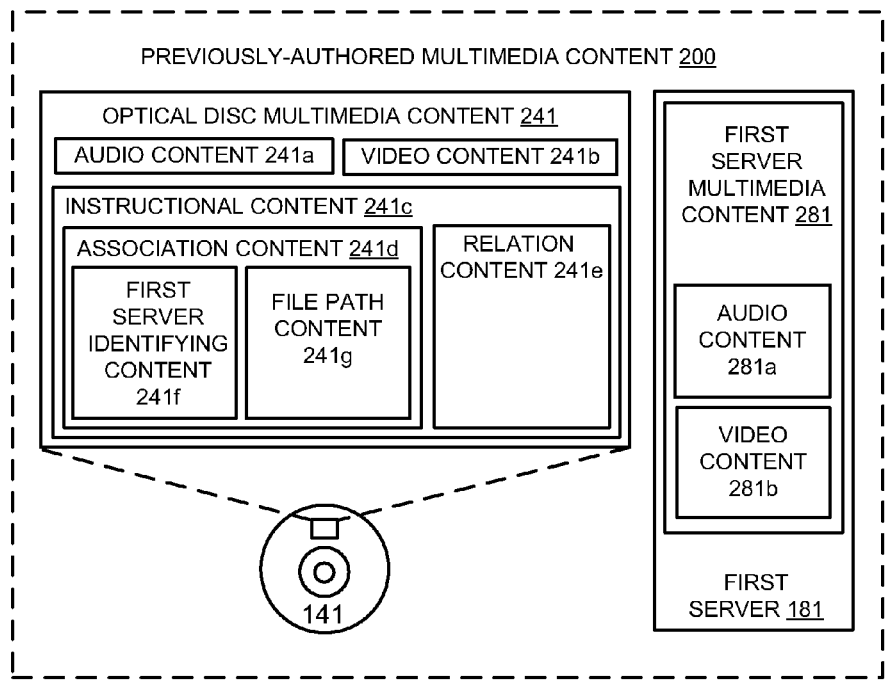
FIG. 2A illustrates a diagram of a first embodiment of a previously-authored multimedia content.

FIG. 2A illustrates a nonlimiting example of a previously-authored multimedia content 200, which includes an optical disc multimedia content 241 and a first server multimedia content 281. The first server multimedia content 281 is stored on a first server 181 and is in the form of a server multimedia bitstream. In the nonlimiting example shown in FIG. 2, the first server multimedia content 281 includes a first server audio content 281a and a first server video content 281b. In some embodiments, the first server multimedia content 281 may further include one or more of a variety of other content as well such as metadata content (e.g., subtitles, text, clip attributes) and interactive content (e.g. a menu). Also, in some embodiments, the first server multimedia content 281 may include only the first server audio content 281a or the first server video content 281b.

Figure 2B:
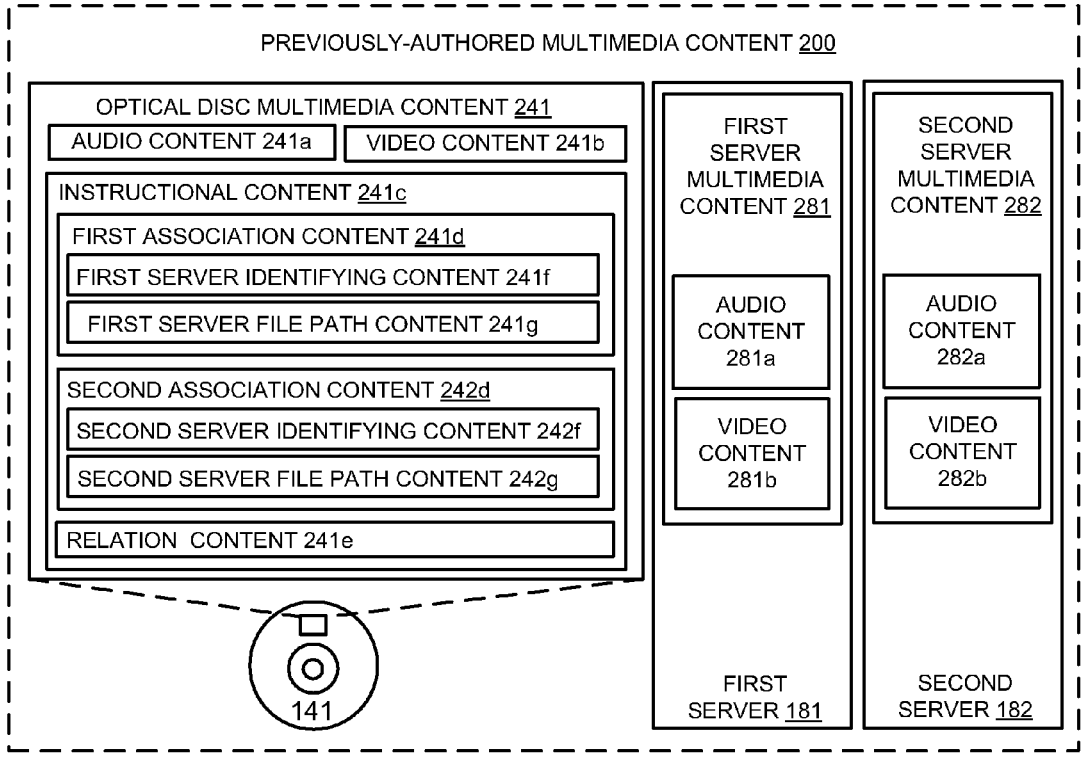
FIG. 2B illustrates a diagram of a second embodiment of a previously-authored multimedia content.

FIG. 2B illustrates another nonlimiting example of a previously-authored multimedia content 200, which also includes a second server multimedia content 282. The second server multimedia content 282 includes a second server audio content 282a and a second server video content 282b. Also, the second server multimedia content 282 is stored on a second server 182 as illustrated in FIG. 2B.

Referring to FIGS. 2A and 2B, the optical disc multimedia content 241 is burned or embedded on the optical disc 141 in the form of an optical disc multimedia bitstream. In the embodiments illustrated in FIGS. 2A and 2B, the optical disc multimedia content 241 includes an optical disc audio content 241a, an optical disc video content 241b, and an instructional content 241c. The instructional content 241c includes a first association content 241d and a relation content 241e.

Figure 9A:
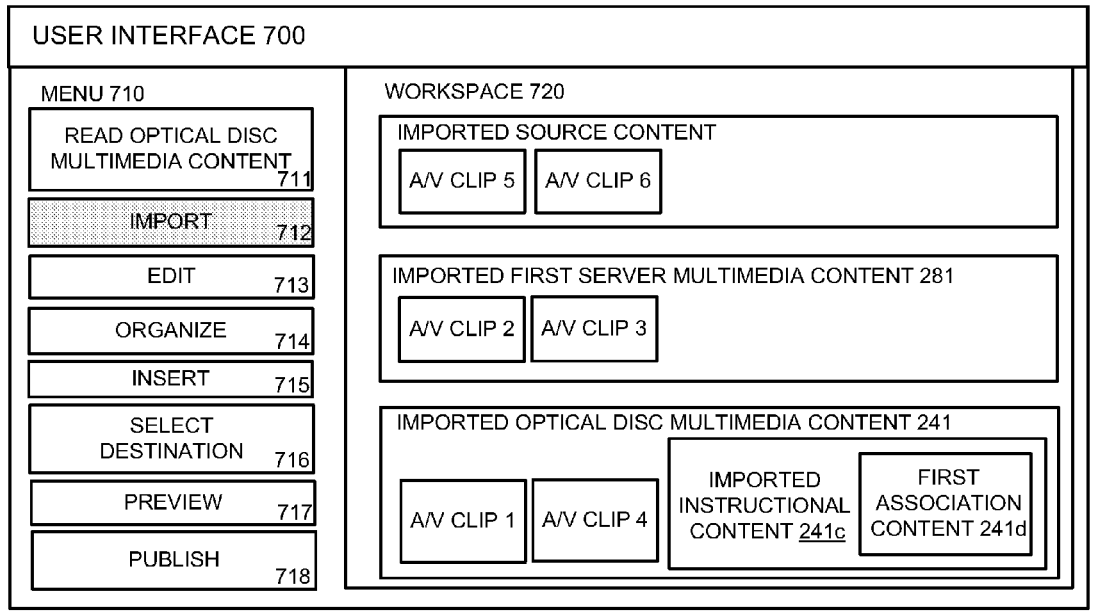
FIG. 9A illustrates a diagram of an embodiment of the user interface displaying an imported source content, an imported first server multimedia content and an imported optical disc multimedia content.
Figure 9B:
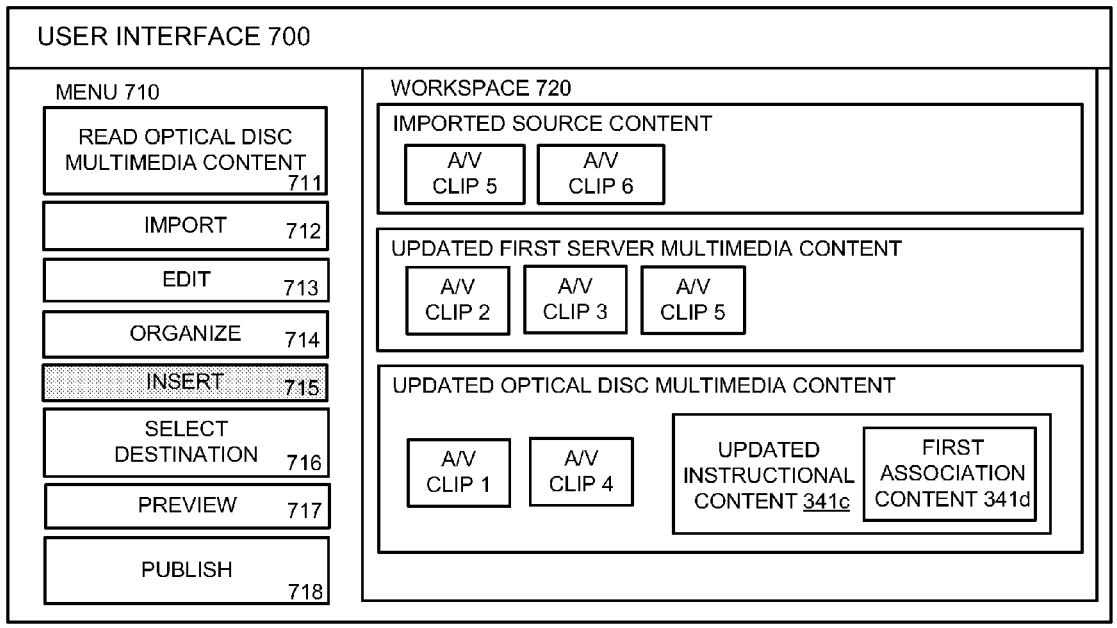
FIG. 9B illustrates a diagram of a first embodiment of the user interface displaying an imported source content, an updated first server multimedia content and an updated optical disc multimedia content.

The relation content 241e includes a relation between at least a portion of the optical disc multimedia content 241 and at least a portion of the first server multimedia content 281 included in the previously-authored multimedia content 200 to define a sequence of the playback, a Picture-in-Picture (PiP) effect to superimpose a portion of content on another portion of the content, or a transition effect during the playback In some embodiments, the relation content 241e is defined according to a timeline or storyboard, which will be discussed later with respect to FIGS. 9A and 9B.

The first association content 241d includes a first server identifying content 241f and a first server file path content 241g. The first server identifying content 241f identifies the first server 181, and the first server file path content 241g includes the location of at least a portion of the first server multimedia content 281 on the first server 181. In some embodiments, the first server file path content 241g is the direct location of the first server multimedia content 281 on the first server 181. In some embodiments, the first server file path content 241g is a program with the parameters to redirect to the exact location of the first server multimedia content 281 on the first server 181. For example, in some embodiments, the first association content 241d may include an association as a connection string or URL according to a communication protocol, such as www.firstserver.com/media/clip2.mpeg.

Further, the first association content 241d also includes parameters for the transmission of the first server multimedia content 281, and/or a destination location of a local storage device.

The instructional content 241c, in the nonlimiting example of previously-authored multimedia content 200 illustrated in FIG. 2B, also includes a second association content 242d. The second association content 242d includes a second server identifying content 242f and a second server file path content 242g. For example, in some embodiments, the second association content 242d may include a URL such as www.secondserver.com/clip2.mp3. In some embodiments, the second association content 242d also includes one or more parameters for the transmission of the second server multimedia content 282, and/or a destination location of a local storage device.

In some embodiments, the instructional content 241c includes a server communication protocol, a code and/or a script (e.g., Blu-Ray Disc Java (BD-J) code, HD DVD interactivity layer (iHD or HDi) code), and/or ancillary data. Further, in some embodiments, the server protocol, code and/or script defines or controls a configuration of the first server 181 or a transmitting behavior of the first server 181. Likewise, in some embodiments, the server protocol, code, and/or script defines or controls a configuration of the second server 182 or a transmitting behavior of the second server 182.

For example, the instructional content 241c includes instructions executable by the first server 181 that cause the first server 181 to convert at least a portion of the first server multimedia content 281 stored on the first server 181 for playback. In some embodiments, the conversion of the at least a portion of the first server multimedia content 281 depends on a transmitting condition. Further, in some embodiments, the instructional content 241c controls the configuration in the server communication protocol, the settings of the first portion of the content from the first server, the type of transmitting (streaming, pre-downloading, or downloading the other portions according to the states in playback), and playback sequence/effects. For example, the instructional content 241c describes the corresponding clip and actions to change the color/contrast to be applied to the clip.

Also, in other embodiments, the optical disc multimedia content 241 includes more or less content than depicted in the embodiment illustrated in FIGS. 2A and 2B. For example, the optical disc multimedia content 241 also includes one or more of a variety of other content as well such as metadata content (e.g., subtitles, text, clip attributes), and interactive content (e.g. a menu).

Figure 3A:
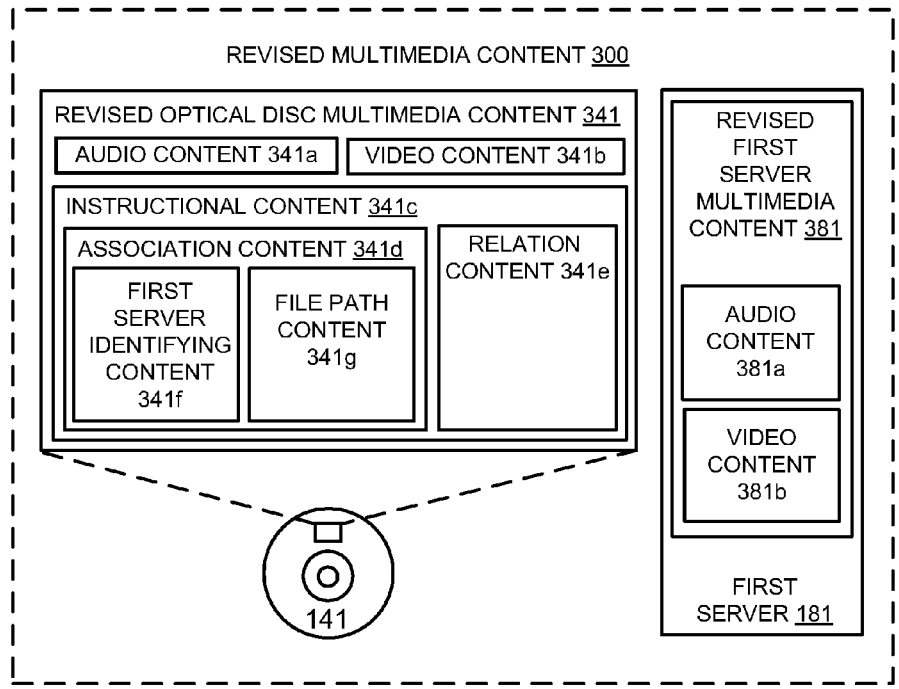
FIG. 3A illustrates a diagram of a first embodiment of a revised multimedia content.
Figure 3B:
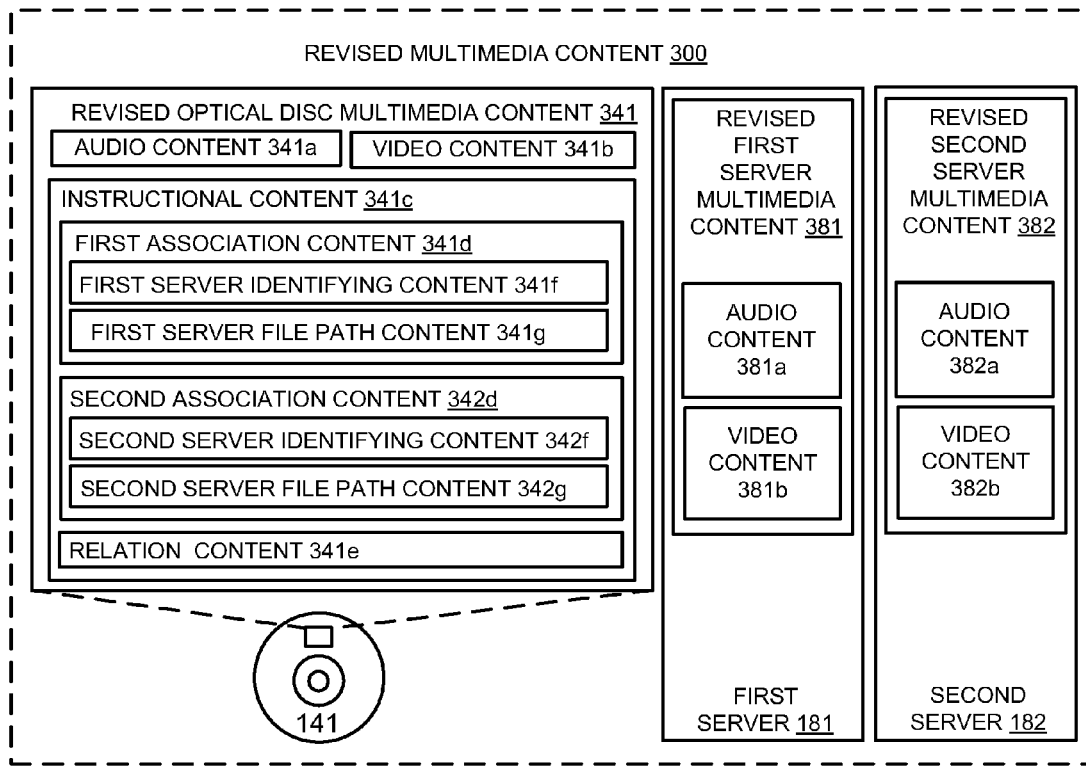
FIG. 3B illustrates a diagram of a second embodiment of a revised multimedia content.

FIG. 3A illustrates a diagram of a first embodiment of a revised multimedia content 300. The revised multimedia content 300 includes at least a portion of the previously-authored multimedia content 200, which has been updated. In FIG. 3A, the revised multimedia content 300 includes a revised optical disc multimedia content 341 and a revised first server multimedia content 381. FIG. 3B illustrates a diagram of a second embodiment of a revised multimedia content 300. Like the embodiment illustrated in FIG. 3A, the revised multimedia content 300 includes at least a portion of the previously-authored multimedia content 200, which has been updated. In some embodiments, the instructional content 241c is the only portion of the previously-authored multimedia content 200 updated. In FIG. 3B, the revised multimedia content 300 includes a revised optical disc multimedia content 341, a revised first server multimedia content 381, and a revised second server multimedia content 382.

Figure 3C:
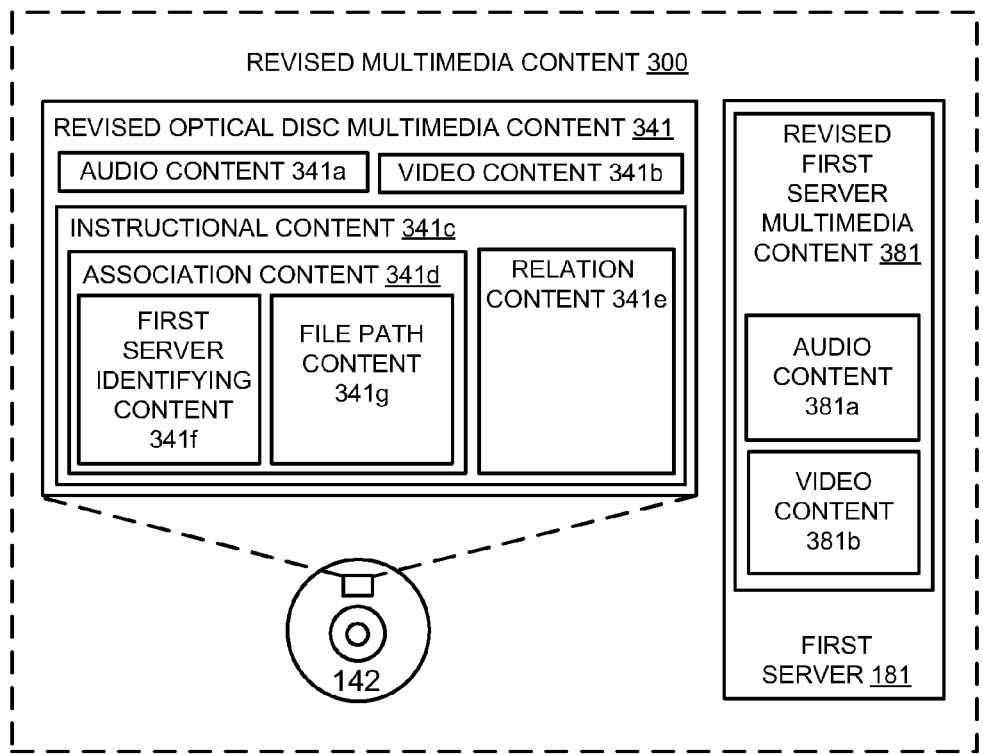
FIG. 3C illustrates a diagram of a third embodiment of a revised multimedia content.

FIG. 3C illustrates a diagram of a third embodiment of a revised multimedia content 300. Like the embodiments illustrated in FIGS. 3A and 3B, the revised multimedia content 300 includes at least a portion of the previously-authored multimedia content 200, which has been updated. Similar to the embodiment illustrated in FIG. 3A, FIG. 3C illustrates the revised multimedia content 300 including a revised optical disc multimedia content 341 and a revised first server multimedia content 381. In this embodiment, however, the revised optical disc multimedia content 341 is not written on the optical disc 141 but instead on optical disc 142, which is a different optical disc.

Figure 4A:
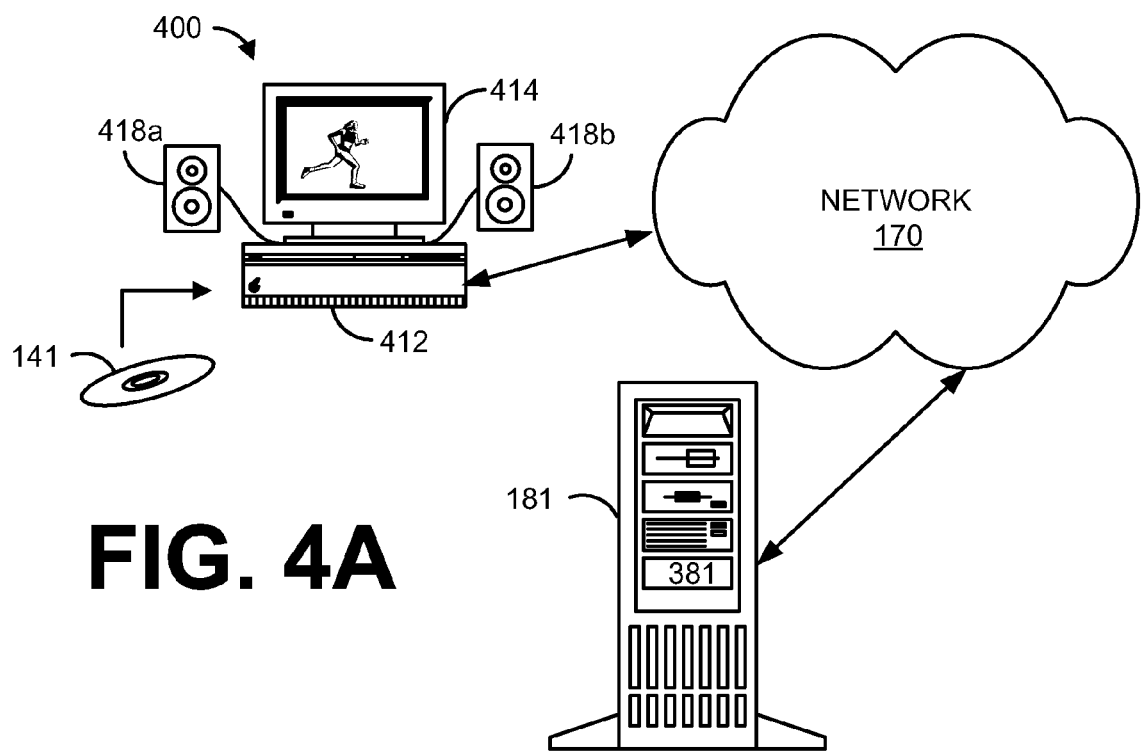
FIG. 4A illustrates a diagram of a first embodiment of a video playback device playing the revised multimedia content.
Figure 4B:
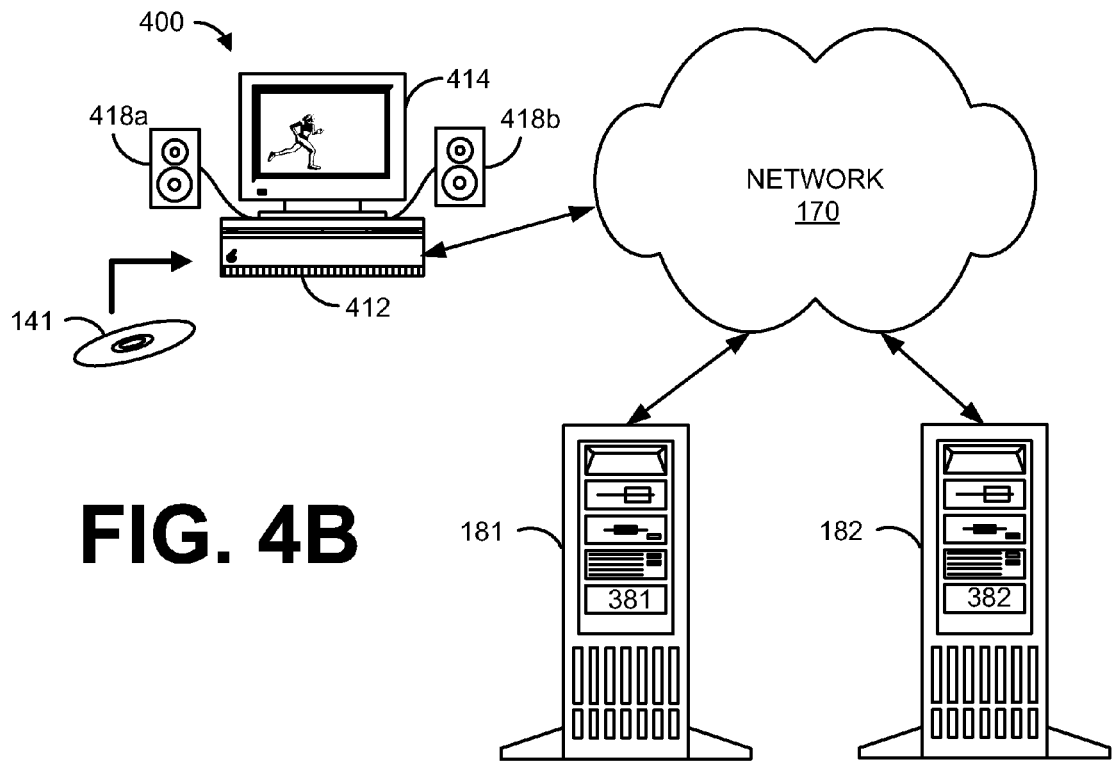
FIG. 4B illustrates a diagram of a second embodiment of a video playback device playing the revised multimedia content.
Figure 4C:
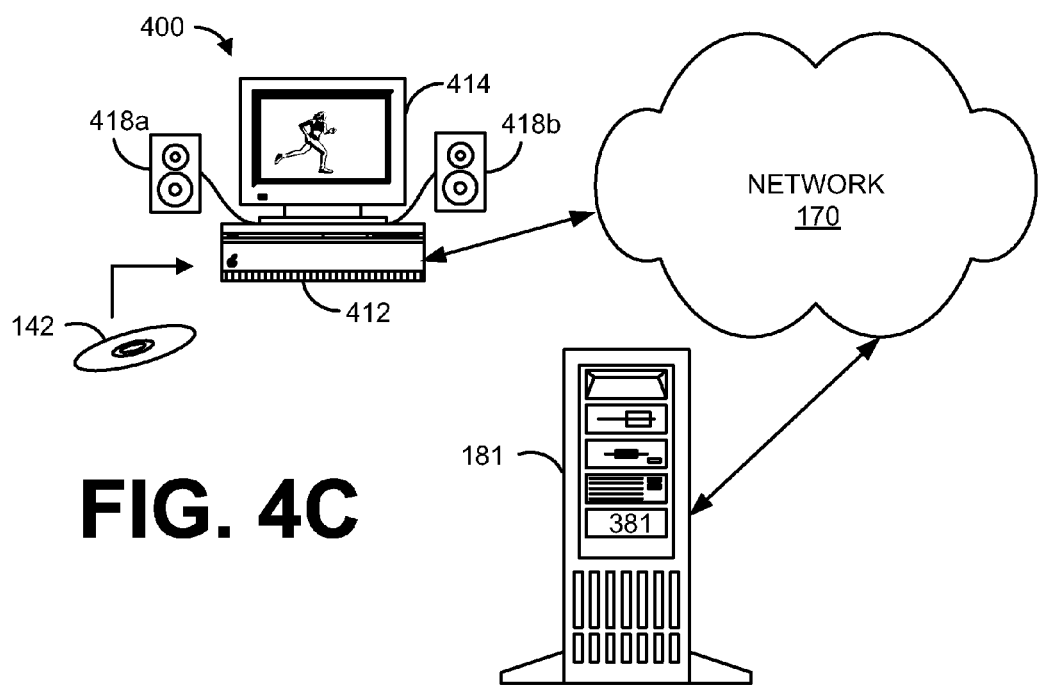
FIG. 4C illustrates a diagram of a third embodiment of a video playback device playing the revised multimedia content.

FIGS. 4A, 4B and 4C illustrate diagrams of various embodiments of a video playback device 400 playing the revised multimedia content 300. The video playback device 400 includes an optical disc player 412, speakers 418a, 418b, and a display 414. The display 414 includes a computer monitor, a plasma screen, a liquid crystal display (LCD) screen, and/or high definition television (HDTV) screen, for example. The optical disc player 412 of the video playback device 400 is coupled to, and/or in communication with, the first server 181 over the network 170. The optical disc player 412 is a CD player, a DVD player, BD player, BD-Live disc player, an iHD player or one of a variety of other optical disc players. In some embodiments, the optical disc player 412 may include a virtual file system as well as at least one gigabyte of local memory storage. The optical disc player 412 reads the revised optical disc multimedia content 341 embedded or burned onto the optical disc 141. The video playback device 400 then displays the optical disc video content 341b of the revised optical disc multimedia content 341 on the display 414 and/or plays the optical disc audio content 341a on the speakers 418a, 418b.

FIG. 4A illustrates a diagram of a first embodiment of the video playback device 400 playing the revised multimedia content 300. The video playback device 400 reads the instructional content 341c of the revised optical disc multimedia content 341. When the optical disc player 412 executes the revised instructional content 341c, the optical disc player 412 can download the revised first server multimedia content 381 from the first server 181 over the network 170 according to the first association content 341d.

FIG. 4B illustrates a diagram of a second embodiment of a video playback device 400 playing the revised multimedia content 300. In the embodiment illustrated in FIG. 4B, the revised instructional content 341c also includes a second association content 342d. When the optical disc player 412 executes the revised instructional content 341c of the revised multimedia content 300 illustrated in FIG. 3B, the optical disc player 412 can download the revised first server multimedia content 381 over the network 170 from the first server 181 and the revised second server multimedia content 382 from the second server 182.

FIG. 4C illustrates a diagram of a third embodiment of a video playback device 400 playing the revised multimedia content 300. The embodiment illustrated in FIG. 4C corresponds to the revised multimedia content 300 shown in FIG. 3C, which includes the revised optical disc multimedia content 341 burned on the writeable optical disc 142 instead of optical disc 141. In FIG. 4C, the optical disc player 412 of the video playback device 400 reads the revised optical disc multimedia content 341 on the optical disc 142, and the video playback device 400 otherwise operates as described with respect to FIG. 4A above.

Also, in some embodiments, the revised instructional content 341c includes instructions for controlling the optical disc player 412 to build a connection with the first server 181 based on the first association content 341d. As discussed above with respect to FIGS. 2A, 2B, 3A and 3B, the first association content 341*d* includes a first server identifying content 341*f* and a file path content 341*g*. The file path content 341*g* corresponds to the file path (e.g., location) of at least a portion of the revised first server multimedia content 381 stored on the first server 181. In some embodiments, first association content 341*d* is a connection string or URL according to a communications protocol. An example of the connection string or URL is "http://www.firstserver.com/media/song1.mp3" according to a hypertext transfer protocol (HTTP). In some embodiments, the file path content 341*g* includes a code with one or more parameters to redirect from the location on the first server 181 of the first server multimedia content 281 to the location of the revised first server multimedia content 381 on the first server 181. Further, the instructions control the optical disc player 412 to retrieve the revised first server multimedia content 381 from the first server 181 via the connection. Also, the revised instructional content 341*c* includes instructions that define the transmitting behavior for the revised first server multimedia content 381 from the first server 181 over the built connection.

A nonlimiting example of the instructions included the revised instructional content 341*c* in BD-J are shown below:

```
import java.io.BufferedInputStream;
import java.io.FileOutputStream;
import java.net.HttpURLConnection;
import java.net.URL;
public class HttpSample {
  /**
   * @param args
   */
  public static void main(String[ ] args) throws Exception {
    URL url = new URL("http://www.firstserver.com/media/
       song03.mp3");
    HttpURLConnection conn = (HttpURLConnection)
    url.openConnection( );
    conn.setRequestMethod("GET");
    conn.setDoInput(true);
    conn.setUseCaches(false);
    System.out.println("Content length = " + conn.getContentLength( ));
    java.io.BufferedInputStream in = new BufferedInputStream(conn.
       getInputStream( ));
    FileOutputStream out = new FileOutputStream("NTU_Song.mp3");
    byte[ ] buf = new byte[1024];
    int read = 0;
    while (−1 != (read = in.read(buf))) {
      out.write(buf, 0, read);
    }
    out.close( );
    in.close( );
    conn.disconnect( );
    System.out.println("Done!");
  }
}
```

Figure 5:
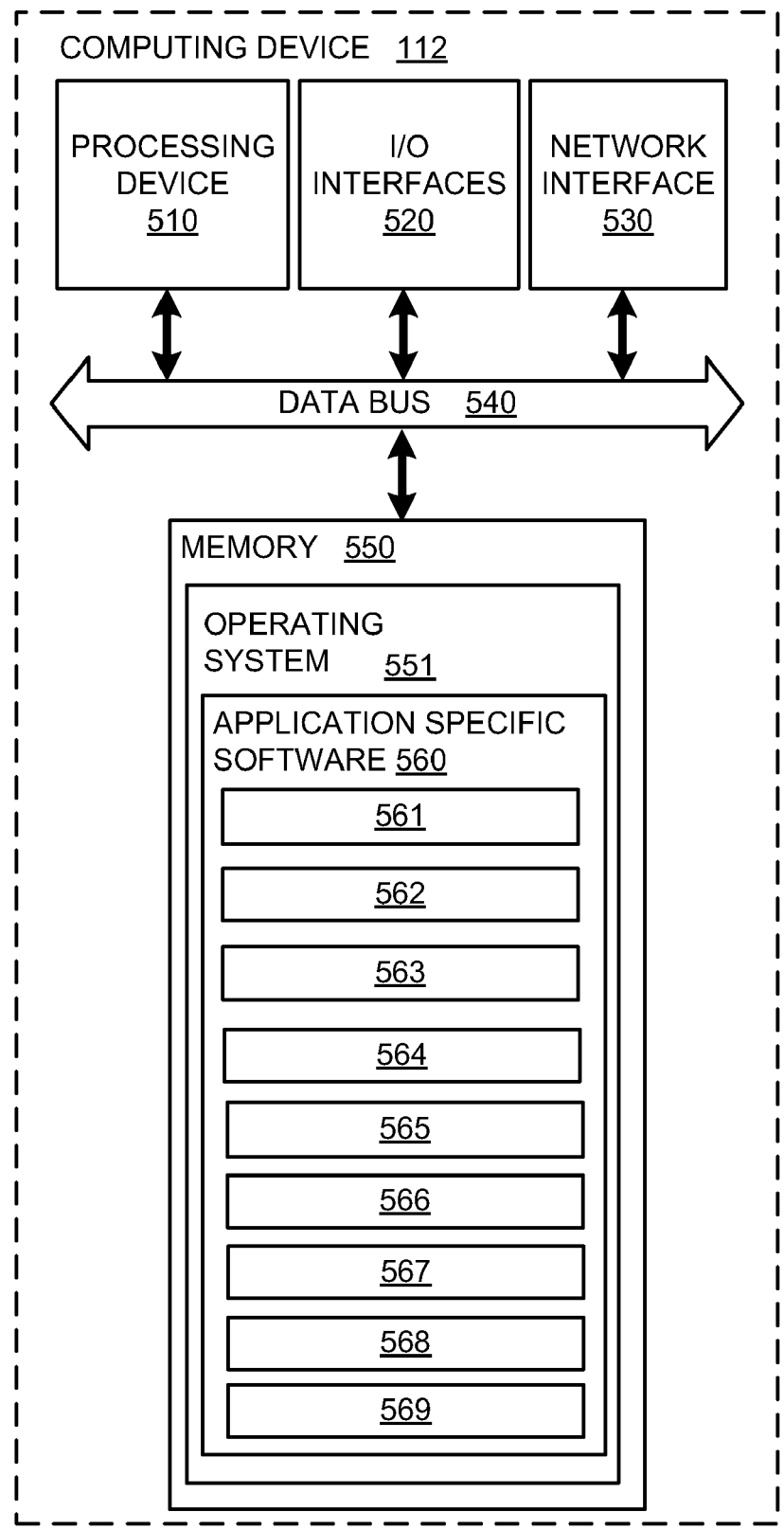
FIG. 5 illustrates a diagram of an embodiment of a computing device.

FIG. 5 illustrates a diagram of an embodiment of a computing device 112. The computing device 112 includes a processing device 510, I/O interfaces 520, a network interface 530, a data bus 540 and a memory 550. The processing device 510 is configured to execute software stored in an operating system 551, including an application specific software 560. The processing device 510 may include a custom-made or commercially-available processor, a central processing unit (CPU), an auxiliary processor among several processors, a semiconductor based microprocessor (in the form of a microchip or chip set), a macroprocessor, and/or generally any device for executing software instructions. When the computing device 112 is in operation, the processing device 510 executes the application specific software 560, communicates data to and from the memory 550 over data bus 540, and generally controls the operation of the computing device 112 pursuant to the application specific software 560.

The I/O interfaces 520 provide any number of interfaces for the input to and output of data from the computing device 112. For example, referring to FIGS. 1A and 1B, data is sent to and/or from a user input device 116, an audio recorder 160, a video recorder 120, and/or an optical disc drive 140. Data may also be sent to and/or from the computing device 112 to and/or from other devices such as, but not limited to, optical disc readers, optical disc burners, printers, digital image cameras, speakers, personal digital assistants (PDAs), cellular phones, scanners, microphones, USB flash drives, external hard drives, memory cards inserted in memory card readers, a mouse, a touchscreen or one or more of a variety of other devices.

The network interface 530 may include various components used to transmit and/or receive data over the network 170, which is in communication with the computing device 112, as illustrated in FIGS. 1A and 1B. By way of example, the network interface 530 may include a device that communicates both inputs and outputs, for example, a modulator/demodulator (e.g., a modem), wireless (e.g., radio frequency (RF)) transceiver, a telephonic interface, a bridge, a router, network card, etc.

The memory 550 may include any one of a combination of volatile memory elements (e.g., random-access memory (RAM), such as DRAM, and SRAM, etc.)) and/or nonvolatile memory elements (e.g., read-only memory (ROM), hard drive, tape, etc.). The memory 550 includes the operating system 551 as well as one or more applications, emulation systems, or emulated applications for any of a variety of operating systems and/or emulated hardware platforms, emulated operating systems, etc. For example, the applications stored in the operating system 551 include the application specific software 560, which may include instructions for revising multimedia content. One of ordinary skill in the art will appreciate that the memory 550 can, and typically will, comprise other components, which have been omitted for purposes of brevity.

In some embodiments, the application specific software 560 can be stored on a variety of computer-readable media for use by, or in connection with, a variety of computer-related systems or methods. In the context of this disclosure, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, or device. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), a portable compact disc read-only memory (CDROM) (optical), a digital versatile disc (optical), a high definition digital versatile disc (optical), and a Blu-ray Disc (optical).

As illustrated in the embodiment in FIG. 5, the application specific software 560 includes a user interface module 561, an optical disc multimedia content read module 562, a server multimedia content importation module 563, an optical disc multimedia content importation module 564, a server multimedia content update module 565, an optical disc multimedia content update module 566, an optical disc multimedia content burn module 567, a server multimedia content exportation module 568, and a conversion module 569.

Figure 7:
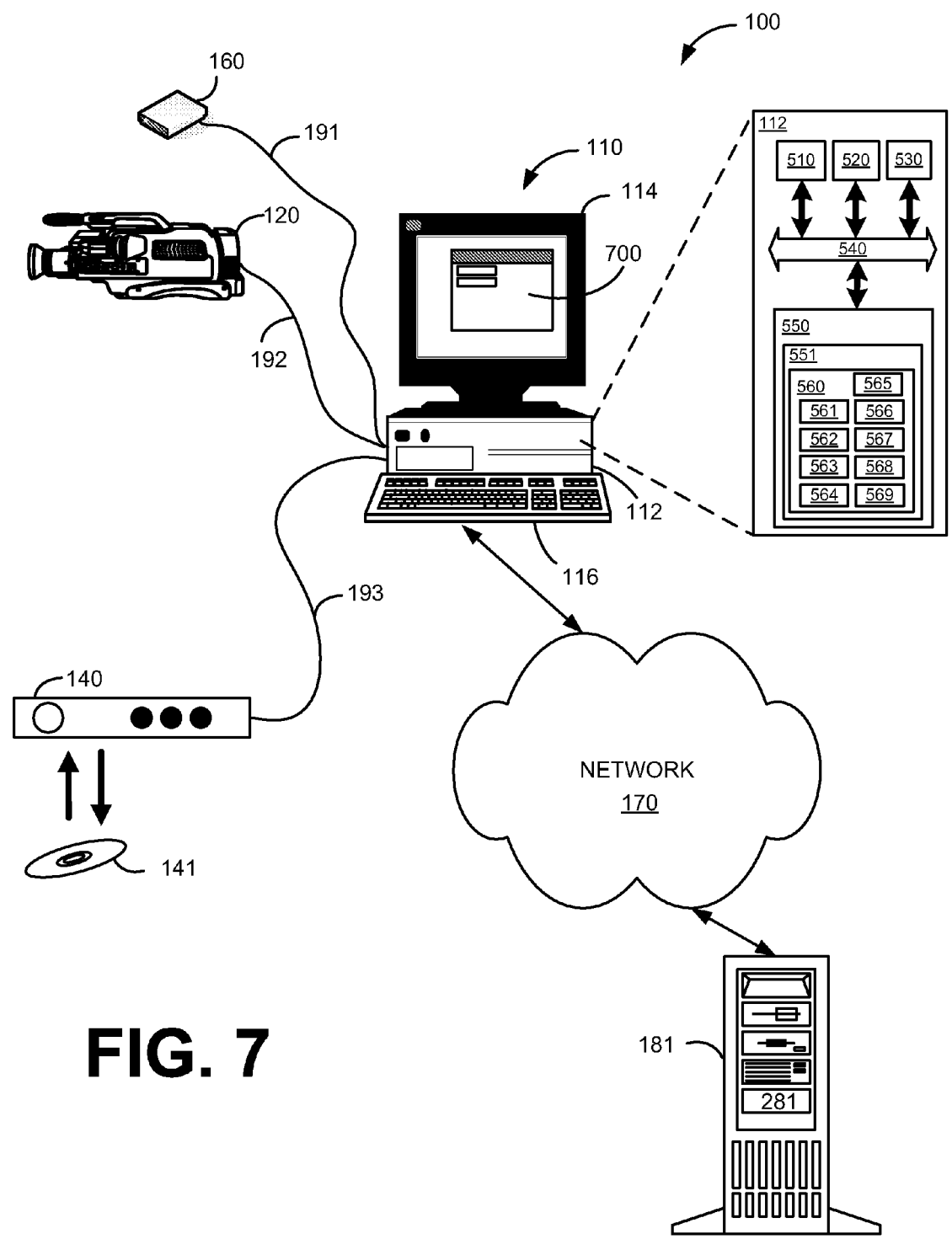
FIG. 7 illustrates a diagram of the first embodiment of a system for revising multimedia content displaying a user interface.

Specifically, the application specific software 560 includes a user interface module 561 configured to provide a user interface 700 on the display 114 of the personal computer 110 as illustrated in FIG. 7. FIGS. 8, 9A, 9B, 10A, 10B, 11A, 11B, 12A, 12B, 13A, 13B, 14, 15, 16A, 17A and 18A also include non-limiting examples of the user interface 700 that may be displayed on the display 114. The user interface 700 may be used in a variety of ways by a user or an editor. As will be discussed below in further detail, the user interface 700 is used to update the previously-authored multimedia content 200 resulting in a revised multimedia content 300.

Figure 8:
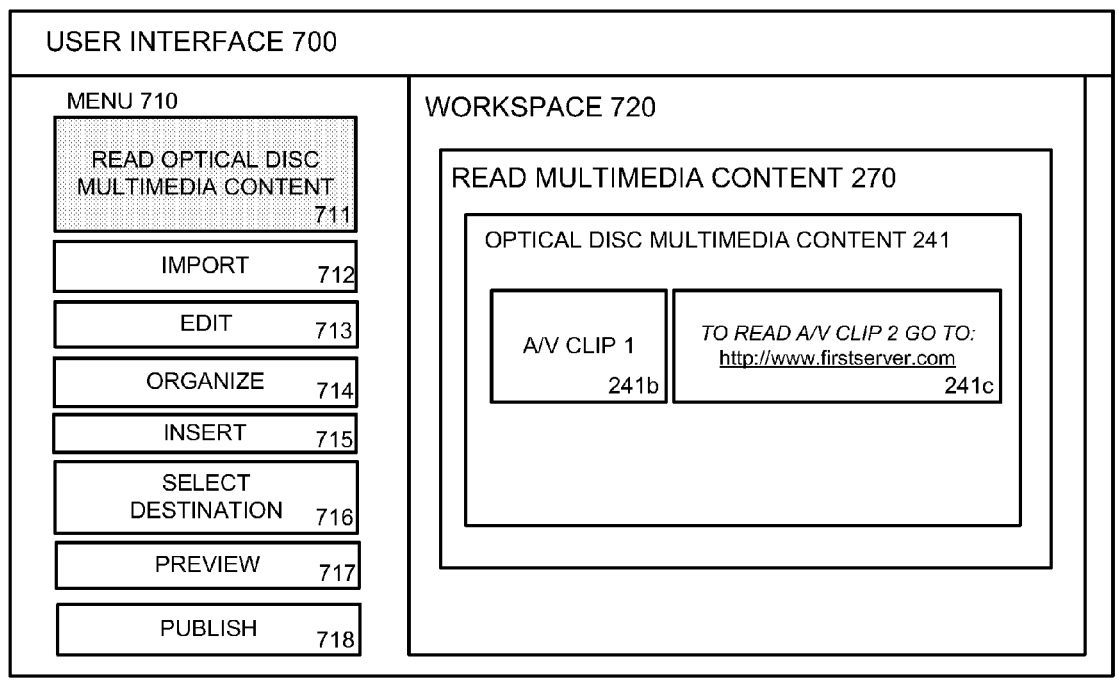
FIG. 8 illustrates a diagram of an embodiment of the user interface displaying an optical disc multimedia content read from an optical disc.

The application specific software 560 also includes an optical disc multimedia content read module 562. The optical disc multimedia content read module 562 is configured to read an instructional content 241c including the first association content 241d from an optical disc 141. The optical disc multimedia content read module 562 is configured to cause an optical disc drive 140 to read the optical disc multimedia content 241, which is previously-authored, from the optical disc 141. In some embodiments, at least a portion of the optical disc multimedia content 241, which is read, is displayed in the user interface 700 on the display 114 of the personal computer 110 as illustrated in FIG. 8. In the nonlimiting example depicted in FIG. 8, the portion of the optical disc multimedia content 241, which is read and displayed, includes an optical disc video content 241b and an instructional content 241c. The instructional content 241c includes a hyperlink or URL to the first server 181.

In the nonlimiting embodiment illustrated in FIG. 5, the application specific software 560 also includes a server multimedia content importation module 563. The server multimedia content importation module 563 is configured to import a first server multimedia content 281 from the first server 181 according to the read instructional content 241c. The server multimedia content importation module 563 may also be configured to import a second server multimedia content 282 from the second server 182. FIG. 9A illustrates a nonlimiting example of a user interface 700 displaying an imported source content, an imported first server multimedia content 281 and an imported optical disc multimedia content 241. Specifically, a source content (including audio/visual clip 5 and audio/visual clip 6) is imported; a first server multimedia content 281 (including an audio/visual clip 2 and audio/visual clip 3) is imported; and the optical disc multimedia content 241 (including instructional content 241c and audio/visual clip 1 and audio/visual clip 4) are imported.

In some embodiments, importing the first server multimedia content 281 includes building a connection between the computing device 112 and the first server 181 based on the instructional content 241c on the optical disc 141. For example, the instructional content 241c includes instructions for building a connection with the first server 181 based on the first association content 241d, which includes a connection string according to a communications protocol. Further, the instructional content 241c includes instructions for defining a transmitting behavior for the first server 181 corresponding to the first server multimedia content 281. Further, the instructional content 241c includes instructions for retrieving the first server multimedia content 281 from the first server 181 via the built connection. The instructional content 241c is discussed in further detail above, and a nonlimiting example of instructions in BD-J code, which may be included in the instructional content 241c, is provided above with respect to FIGS. 4A, 4B, and 4C.

In some embodiments, a directive is received that triggers the server multimedia content importation module 563 to import content. For example, a click or selection of the hyperlink and/or the import button 712 on the user interface 700 depicted in FIG. 8 may cause the first server multimedia content 281 to be imported from the first server 181. As another example (not illustrated), a user may select an import button 712 on the menu 710 of the user interface 700, and a list of servers storing server multimedia content is displayed on the user interface 700. The user may select (from the displayed list) a server from which to import a server multimedia content. As yet another example, the server multimedia content importation module 563 may begin importing the first server multimedia content 281 responsive to reading the instructional content 241c of the optical disc multimedia content 241.

In the embodiment illustrated in FIG. 5, the application specific software 560 also includes an optical disc multimedia content importation module 564. The optical disc multimedia content importation module 564 is configured to import the optical disc multimedia content 241 from the optical disc 141 using the optical disc drive 140. In some embodiments, a directive is received that triggers the optical disc multimedia content importation module 564 to import the optical disc multimedia content 241. Further, in some embodiments, the directive is received on the user interface 700. For example, a click or selection of the import button 712 on the user interface 700 depicted in FIG. 8 may cause the optical disc multimedia content 241 to be imported from the optical disc 141. As yet another example (not illustrated), the optical disc multimedia content importation module 564 is configured to begin importing the optical disc multimedia content 241 responsive to reading the optical disc multimedia content 241 from the optical disc 141 according to the optical disc multimedia content read module 562.

In the nonlimiting embodiment illustrated in FIG. 5, the application specific software 560 also includes a server multimedia content update module 565. The server multimedia content update module 565 is configured to update the imported first server multimedia content 281. The imported first server multimedia content 281, which is updated, results in a revised first server multimedia content 381 once the updated first server multimedia content is exported to the first server 181. Further, in some embodiments, the server multimedia content update module 565 is configured to update the imported second server multimedia content 282. The imported second server multimedia content 282, which is updated, results in a revised second server multimedia content 382 once the updated second server multimedia content is exported to the second server 182.

For example, as shown in the user interface 700 illustrated in FIG. 9A, the source content (including the audio/visual clip 5 and the audio/visual clip 6), first server multimedia content 281 and the optical disc multimedia content 241 have been imported. In FIG. 9B, the imported first server multimedia content 281 is updated by having at least a portion of the imported source content added. Specifically, FIG. 9B illustrates that audio/visual clip 5 of the imported source content has been added to the imported first server multimedia content 281 and yields the updated first server multimedia content.

In some embodiments, the server multimedia content update module 565 is configured to receive edits associated with the first server multimedia content 281. Further, in some embodiments, these edits are received on the user interface 700. The edits may include, but are not limited to, adjusting contrast, color, volume, speed, length as well as cropping, rotating and/or adding additional content. The server multimedia content update module 565 is configured to modify the first server multimedia content 281 in accordance with the received edits. Consequently, the updated first server multimedia content includes the modified first server multimedia content.

In some embodiments, the server multimedia content update module 565 is configured to import a source content and replace at least a portion of the imported first server multimedia content 281 and/or at least a portion of the imported second server multimedia content 282 with at least a portion of the imported source content. As discussed above regarding FIGS. 1A and 1B, the imported source content may include audio content, video content, audio/visual content, interactive content, instructional content, metadata content and/or one or more of a variety of other source content.

Figure 10A:
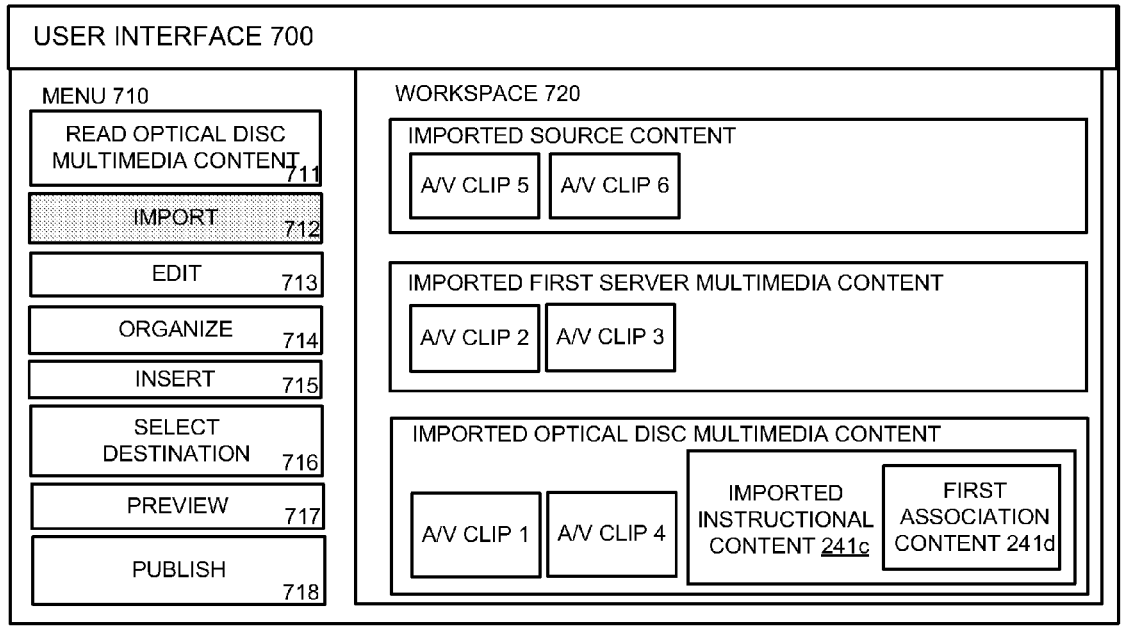
FIG. 10A illustrates a diagram of a second embodiment of the user interface displaying an imported source content, an imported first server multimedia content and an imported optical disc multimedia content.
Figure 10B:
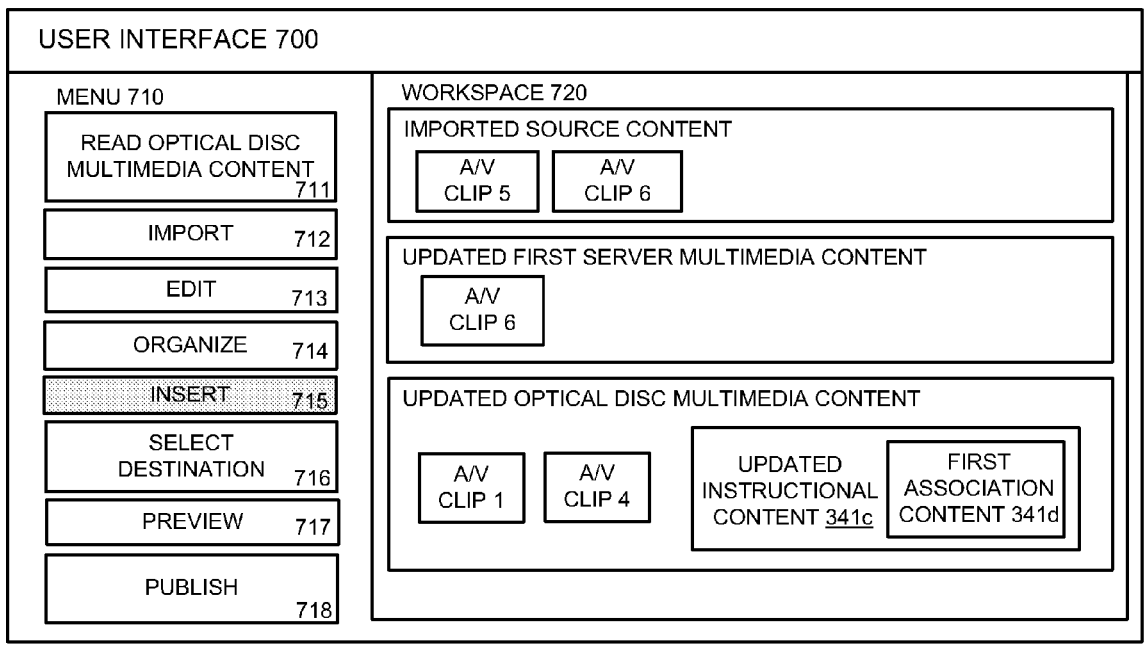
FIG. 10B illustrates a diagram of a second embodiment of the user interface displaying an imported source content, an updated first server multimedia content and an updated optical disc multimedia content.

For example, as shown in the user interface 700 illustrated in FIG. 10A, the source content (including the audio/visual clip 5 and the audio/visual clip 6), the first server multimedia content 281 and the optical disc multimedia content 241 have been imported. In FIG. 10B, the imported first server multimedia content 281 is updated by having at least a portion of the imported source content replace the imported first server multimedia content 281. Specifically, FIG. 10B illustrates that audio/visual clip 6, which is a portion of the imported source content, has replaced audio/visual clip 2 and audio/visual clip 3 of the imported first server multimedia content 281 and yields the updated first server multimedia content 281 including the audio/visual clip 6.

Figure 11A:
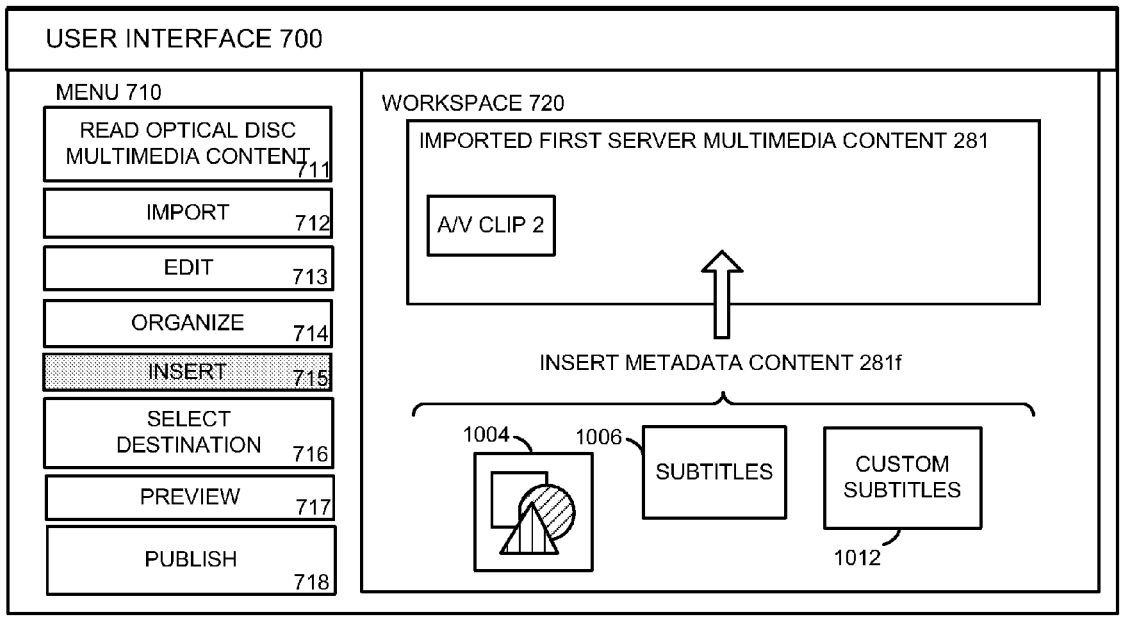
FIG. 11A illustrates an embodiment of the user interface displaying metadata content for insertion in the imported first server multimedia content.
Figure 11B:
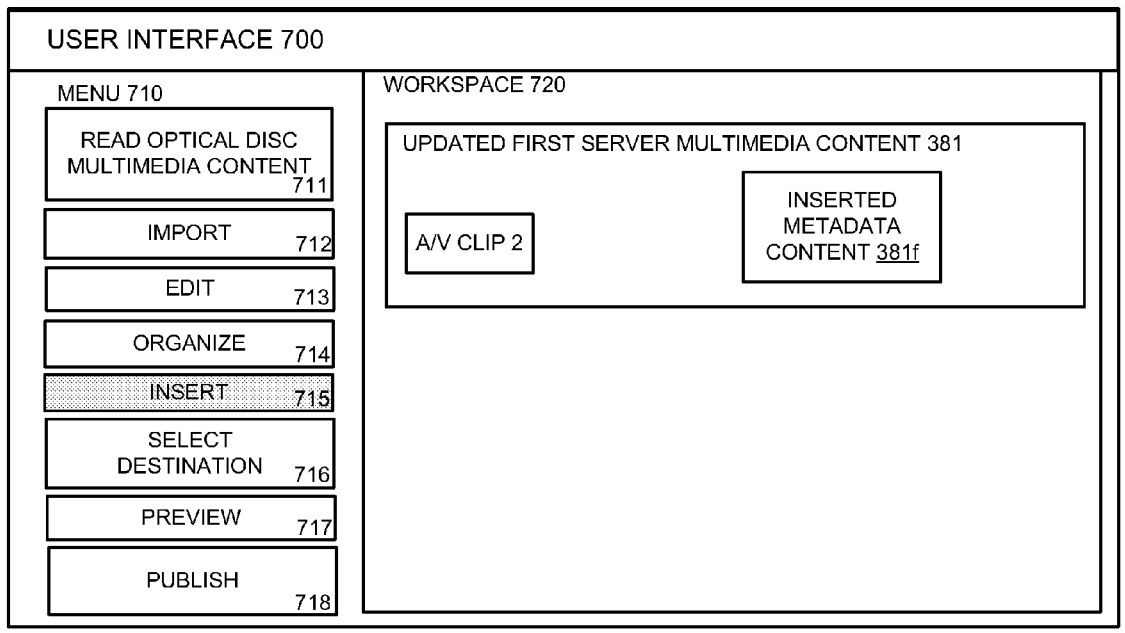
FIG. 11B illustrates an embodiment of the user interface displaying an updated first server multimedia content after the metadata content has been inserted.

In some embodiments, the server multimedia content update module 565 is configured to insert metadata content and/or interactive content into the imported first server multimedia content 281 and/or the imported second server multimedia content 282. For example, FIG. 11A illustrates an imported first server multimedia content 281 on a user interface 700 and a metadata content 281f being inserted (according to a user's instructions) into the imported first server multimedia content 281. The metadata content 281f being inserted includes shapes 1004, subtitles 1006, and custom subtitles 1012, and in other embodiments, other metadata content is inserted. FIG. 11B shows the updated first server multimedia content including the inserted metadata content 381f.

Figure 12A:
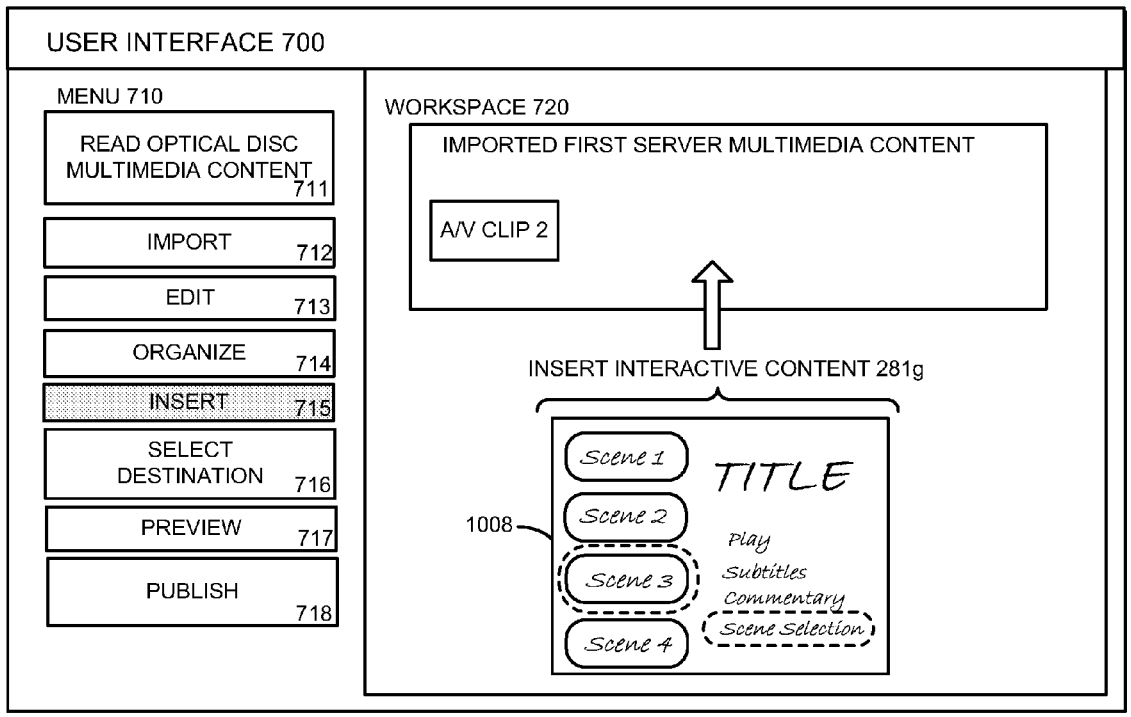
FIG. 12A illustrates an embodiment of the user interface displaying interactive content including a interactive content for insertion.
Figure 12B:
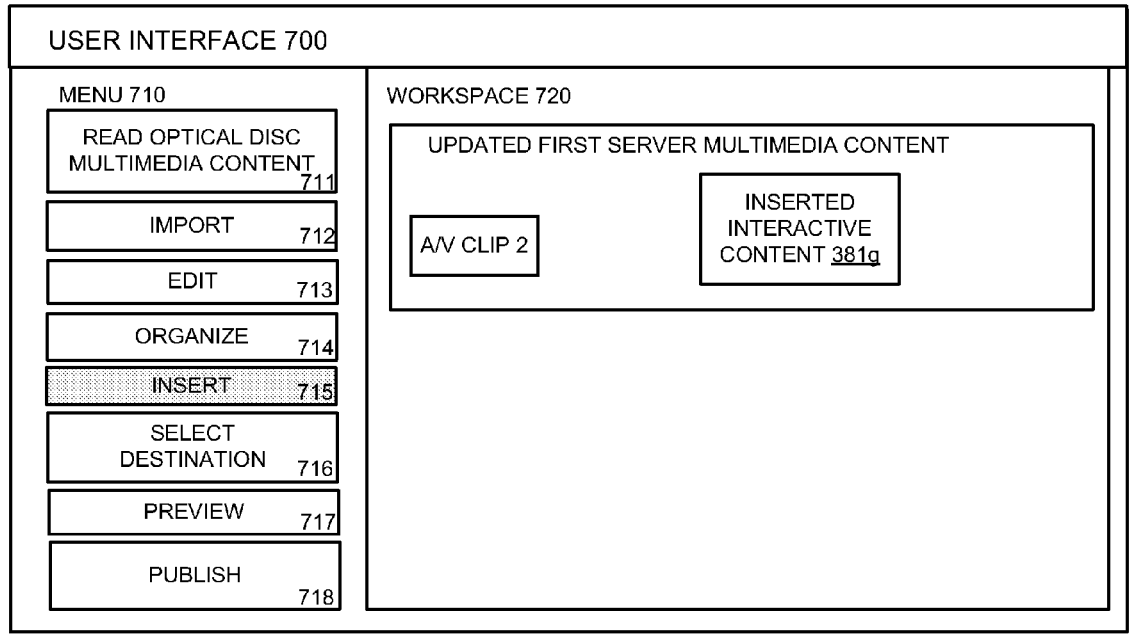
FIG. 12B illustrates an embodiment of the user interface displaying an updated first server multimedia content after the interactive content has been inserted.

As another example, FIG. 12A illustrates an imported first server multimedia content 281 on a user interface 700 and an interactive content 281g being inserted into the imported first server multimedia content 281. The interactive content 281g being inserted includes a menu 1008. A viewer using the video playback device 400 may use the menu 1008 to select scenes, commentary, subtitles, etc. FIG. 12B shows the updated first server multimedia content including the inserted interactive content 381g.

Figure 13A:
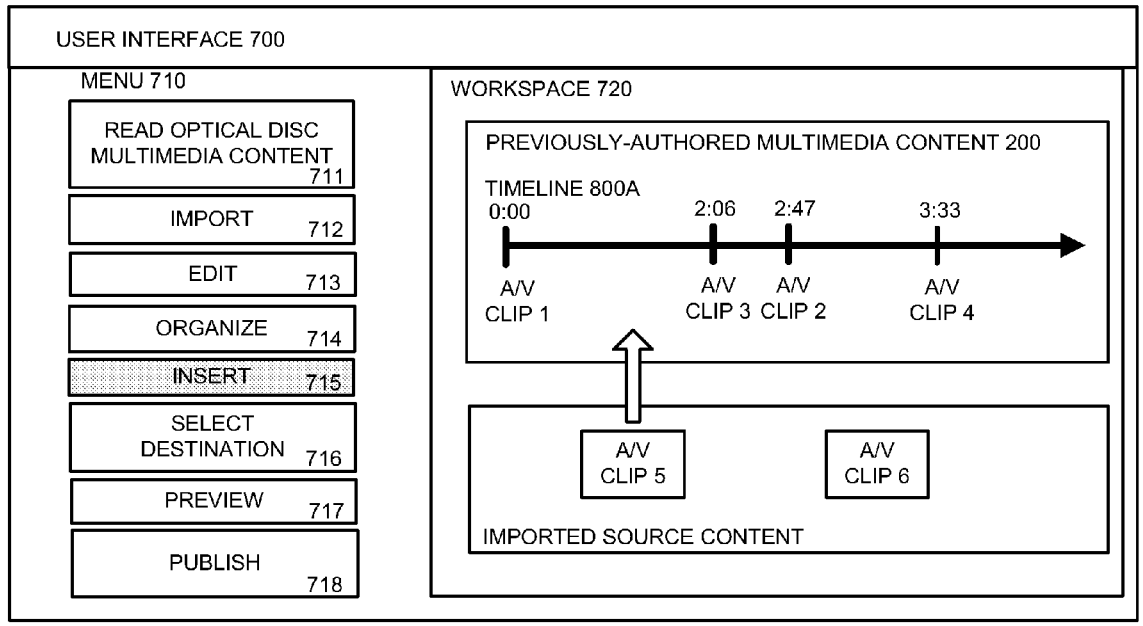
FIG. 13A illustrates a diagram of a first embodiment of the user interface displaying a representation of the imported multimedia content.
Figure 13B:
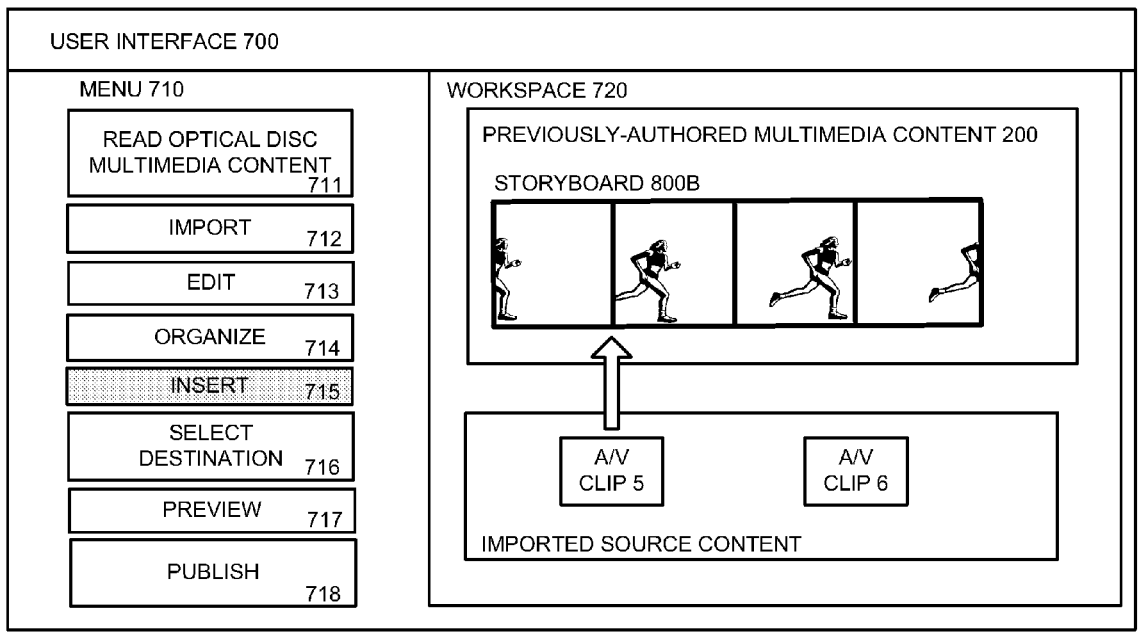
FIG. 13B illustrates a diagram of a second embodiment of the user interface displaying a representation of the imported multimedia content.
Figure 14:
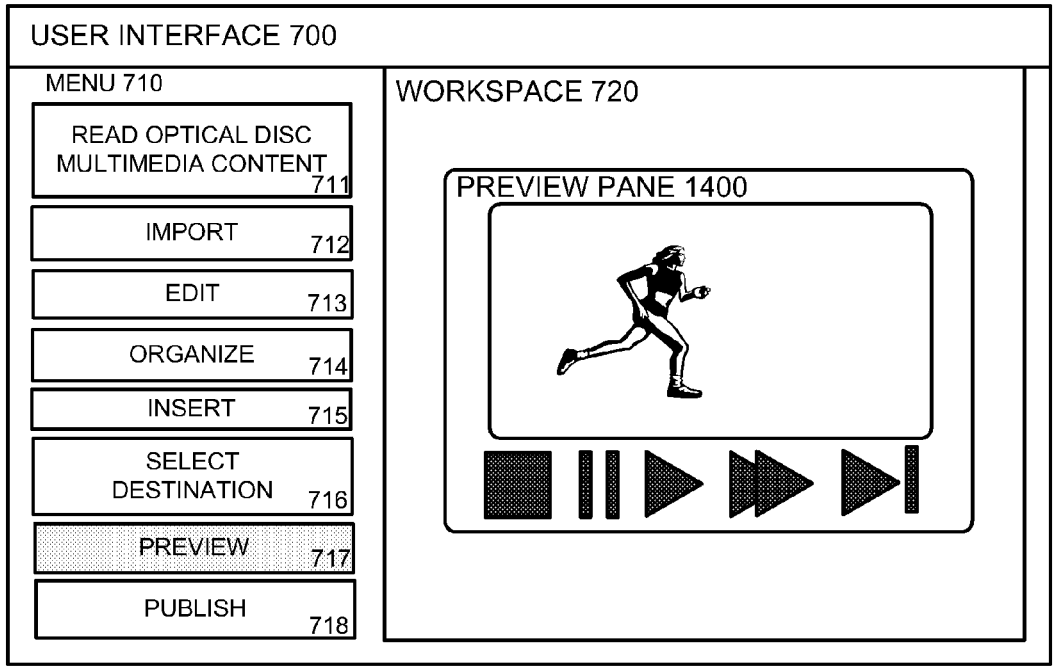
FIG. 14 illustrates an embodiment user interface displaying a preview pane.

As another example, FIGS. 13A and 13B each display a representation of the previously-authored multimedia content 200 based on the optical disc multimedia content 241 imported by the optical disc multimedia content importation module 564 from the optical disc 141 and the first server multimedia content 281 imported by the server multimedia content importation module 563 from the first server 181. In FIG. 13A, the previously-authored multimedia content 200 is represented as a timeline 800A, and in FIG. 13B, the previously-authored multimedia content 200 is represented as a storyboard 800B including thumbnails representing audio/visual clips. In FIGS. 13A and 13B, audio/visual clip 5 is added to the previously-authored multimedia content 200 represented as a timeline 800A or a storyboard 800B, respectively. In some embodiments, audio/visual clip 6 is also added to the previously-authored multimedia content 200 represented as a timeline 800A or a storyboard 800B, but the audio/visual clip 6 may be added to the imported second server multimedia content 282 instead of the imported first server multimedia content 281.

The application specific software 560 also includes an optical disc multimedia content update module 566. The optical disc multimedia content update module 566 is configured to update at least a portion of the imported optical disc multimedia content 241, which becomes an updated optical disc multimedia content. In some embodiments, the optical disc multimedia content update module 566 is configured to update the imported instructional content 241c. For example, the imported instructional content 241c is replaced or edited with instructional content generated, created or imported using the user interface 700. As another example, a first association content 241d and/or a second association content is replaced with an updated first association content 341d and/or an updated second association content 342d. In some embodiments, a second association content 242d is generated when a first server multimedia content 281, which may have been updated, is destined for (e.g., will be exported to) a second server 182. Hence, the second association content 242d includes an association between the updated first server multimedia content and the second server 182.

Figure 15:
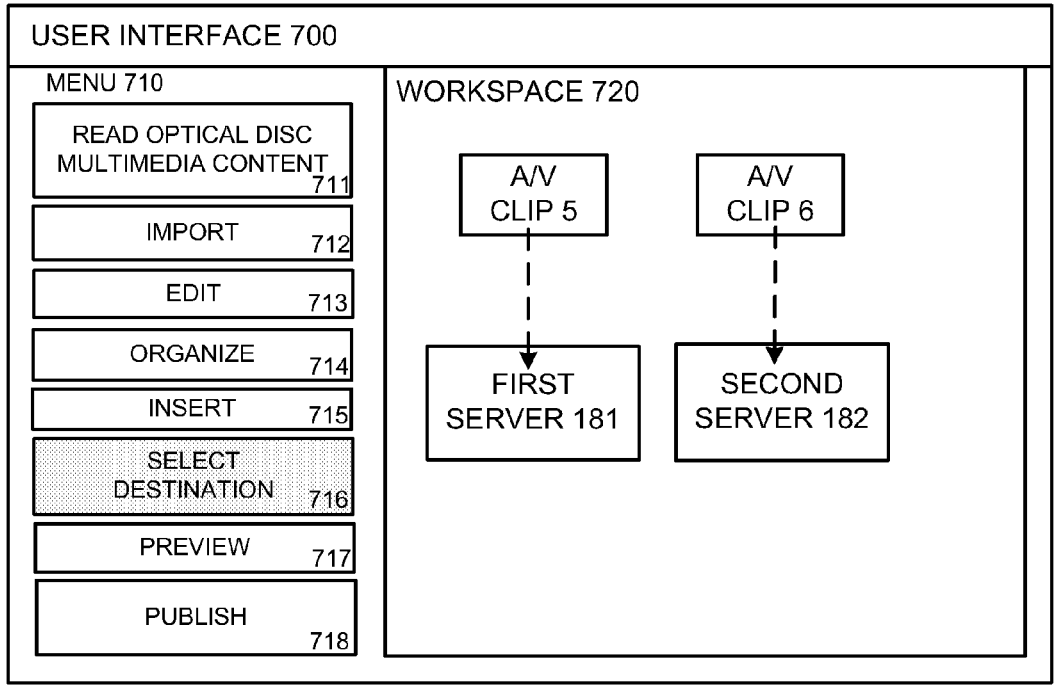
FIG. 15 illustrates an embodiment of the user interface displaying selected destinations for imported source content.

FIG. 15 illustrates a diagram of the user interface 700 showing the selection of a destination for each of the imported audio/visual clips, which were included in the imported source content. For example, a user may select a server as associated with a particular content by dragging a clip to a destination on the provided user interface 700. Selecting the destination for the imported source content is useful where the imported source content is added to a representation of the previously-authored multimedia content 200 instead of a representation of the first server multimedia content 281. In FIG. 15, audio/visual clip 5 is selected as being destined for the first server 181, and audio/visual clip 6 is selected as being destined for the second server 182.

In some embodiments, the optical disc multimedia content update module 566 is configured to update the relation content 241e of the instructional content 241c of the optical disc multimedia content 241 according to edits received regarding the timeline 800A or storyboard 800B. For example, with regard to the example illustrated in FIGS. 9B, 13A and 13B, the relation content 241e is updated to include a relation between audio/visual clip 1, which is included in the optical disc multimedia content 241, and audio/visual clip 5, which will be included in the revised first server multimedia content 381, once the updated first server multimedia content is exported to the first server 181. In FIG. 15, audio/visual clip 5 is selected as being destined for the first server 181, and audio/visual clip 6 is selected as being destined for the second server 182.

Figure 17A:
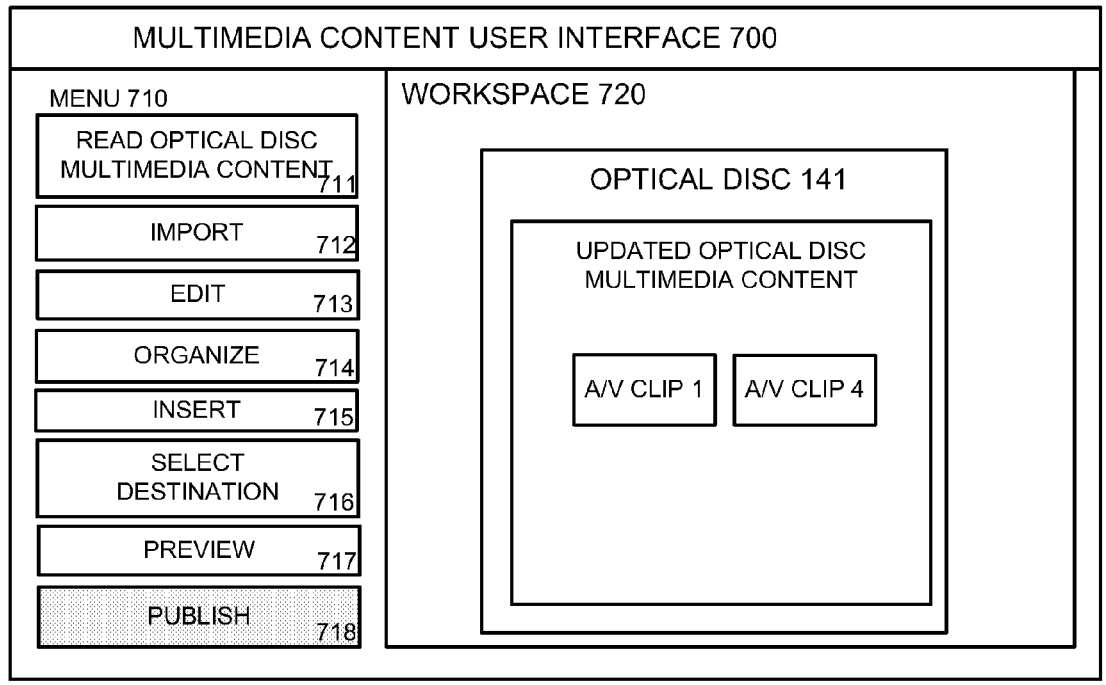
FIG. 17A illustrates an embodiment of the user interface displaying an optical disc multimedia content to be burned onto an optical disc.

The application specific software 560 in the embodiment illustrated in FIG. 5 also includes an optical disc multimedia content burn module 567. The optical disc multimedia content burn module 567 is configured to burn the updated optical disc multimedia content onto an optical disc for storage as a revised optical disc multimedia content 341. In some embodiments, the optical disc multimedia content burn module 567 is configured to receive a trigger. The trigger is activated by a user clicking or selecting the publish button 718 on the menu 710 of the user interface 700 as shown in FIG. 17A. The trigger may indicate that the burning of the updated optical disc multimedia content onto the optical disc 141 should begin, and responsive to the optical disc multimedia content burn module 567 receiving the trigger, the updated optical disc multimedia content is burned onto the optical disc 141 resulting in a revised optical disc multimedia content 341.

Figure 17B:
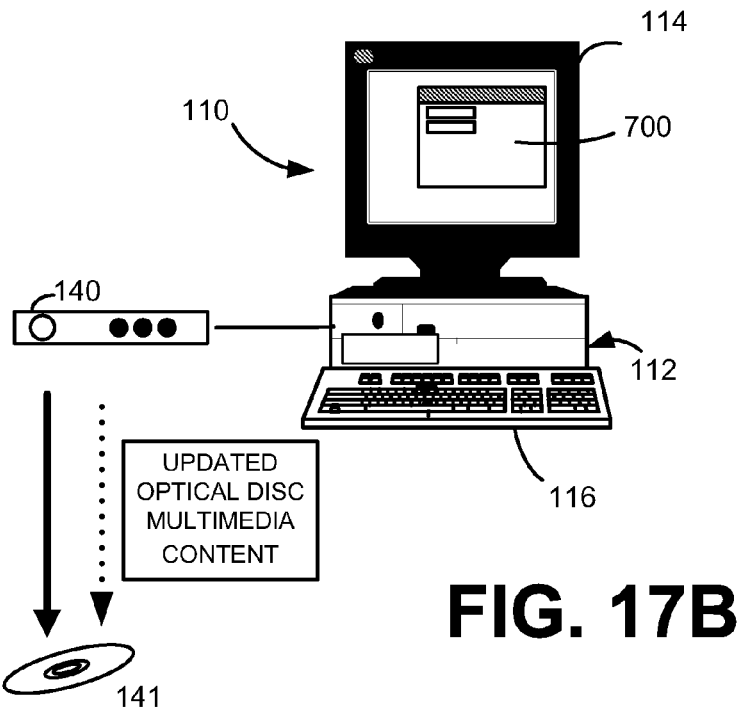
FIG. 17B illustrates an nonlimiting example of the optical disc multimedia content to be burned onto an optical disc in an embodiment of the system for revising multimedia content.
Figure 18A:
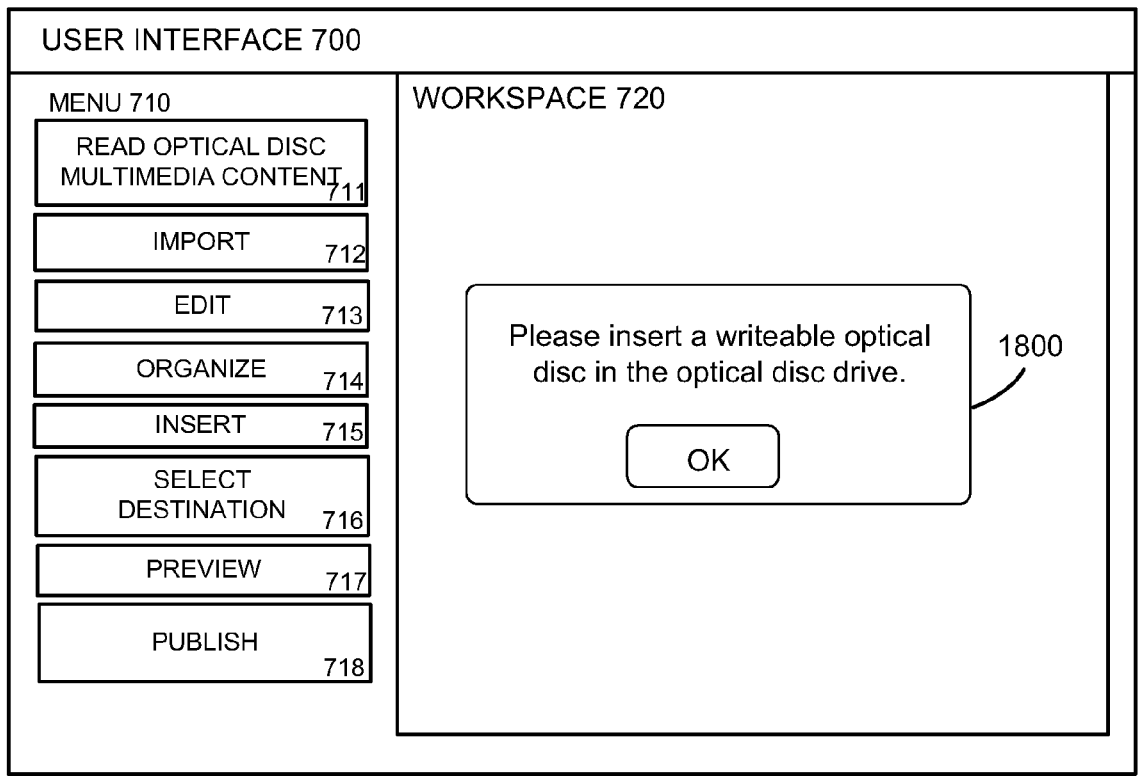
FIG. 18A illustrates an embodiment of the user interface displaying a message regarding burning the updated optical disc multimedia content on the optical disc.
Figure 18B:
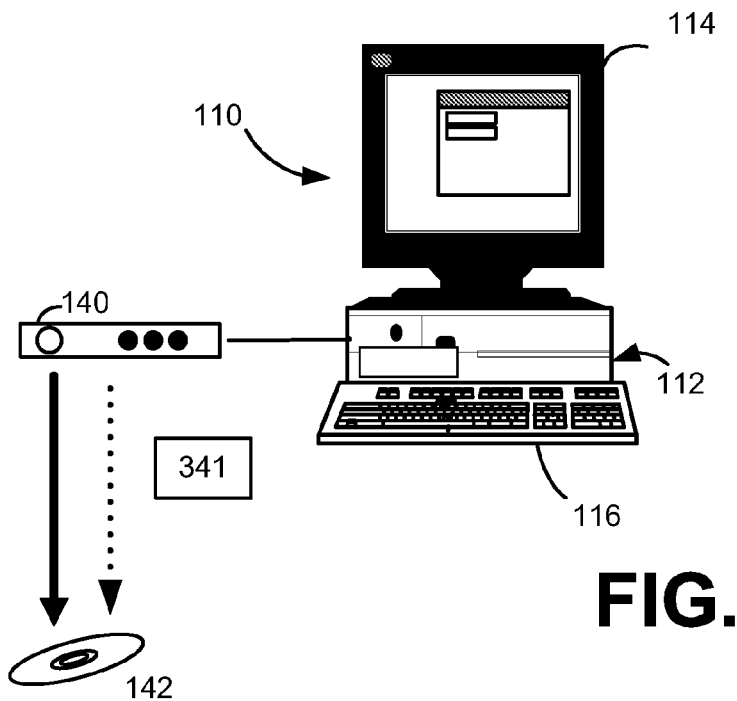
FIG. 18B illustrates an nonlimiting example of the optical disc multimedia content to be burned onto an optical disc different from the optical disc previously inserted in the optical disc drive.

In some embodiments, the optical disc multimedia content burn module 567 may also be configured to determine whether the optical disc 141, which was read by the optical disc drive 140 according to the optical disc multimedia content read module 562, is capable of having the updated optical disc multimedia content burned onto it. If the optical disc 141 is capable (e.g., writeable) of having the updated optical disc multimedia content burned onto it, then optical disc multimedia content burn module 567 is configured to burn or embed the updated optical disc multimedia content onto the optical disc 141 as illustrated in FIG. 17B. If the optical disc 141 is not capable (e.g., writeable) of having the updated optical disc multimedia content burned onto it, then optical disc multimedia content burn module 567 is configured to provide a message on the user interface 700 indicating that the updated optical disc multimedia content cannot be burned onto the optical disc 141 and/or that a writeable optical disc 142 must be inserted in the optical disc drive 140. For example, the user interface 700 illustrated in FIG. 18A shows a message 1800 indicating that a writeable optical disc 142 should be inserted in the optical disc drive 140. The optical disc multimedia content burn module 567 may also be configured to burn or embed the updated optical disc multimedia content onto the writeable optical disc 142 responsive to a writeable optical disc 142 being inserted in the optical disc drive 140.

The application specific software 560 in the embodiment illustrated in FIG. 5 also includes a server multimedia content exportation module 568. The server multimedia content exportation module 568 is configured to export the updated first server multimedia content. In some embodiments, the updated first server multimedia content is exported according to the first association content 241d. Also, the server multimedia content exportation module 568 is configured to export the updated second server multimedia content to the second server 182. In some embodiments, the updated first server multimedia content is exported according to the second association content 242d.

Also, in some embodiments, the server multimedia content exportation module 568 is configured to export the updated first server multimedia content to the second server 182 for storage as a revised second server multimedia content 382. In these embodiments, a second association content 342d is generated by optical disc multimedia content update module 566, which will be discussed further below. The generated second association content 342d includes an association between the updated first server multimedia content and the second server 182. In this case, the updated first server multimedia content is exported to the second server 182 according to the generated second association content 342d.

Figure 16A:
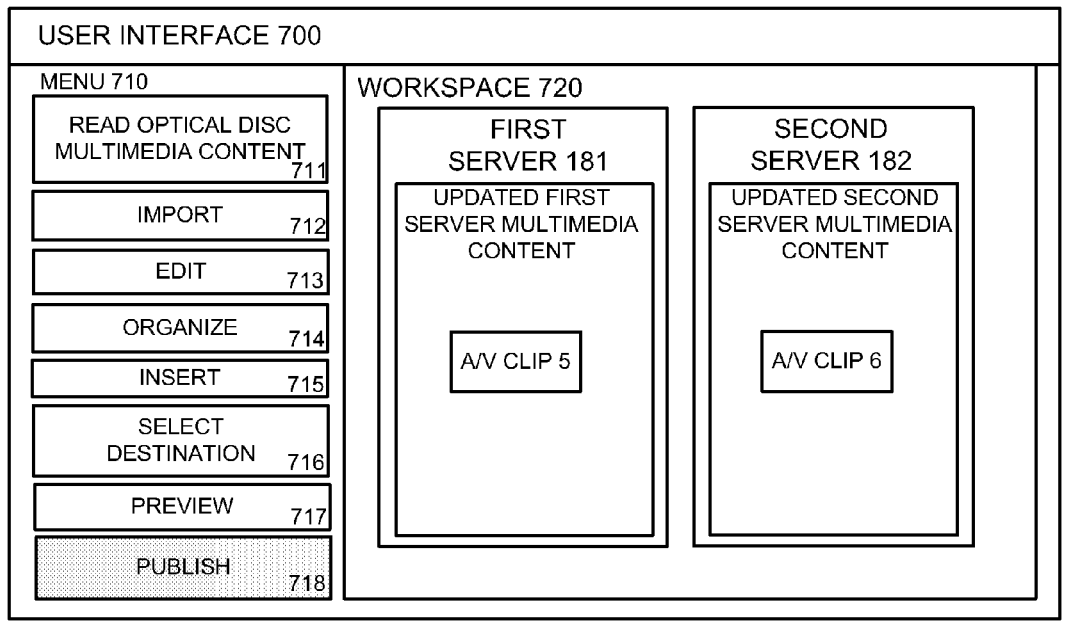
FIG. 16A illustrates an embodiment of the user interface displaying a first server multimedia content and a second server multimedia content to be exported to the first server and second server respectively.
Figure 16B:
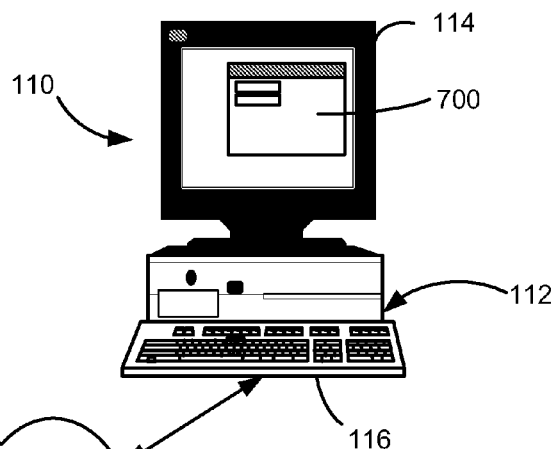
FIG. 16B illustrates a nonlimiting example of the first server multimedia content and a second server multimedia content to be exported to the first server and second server respectively in the second embodiment of the system for revising multimedia content.
Figure 16B:
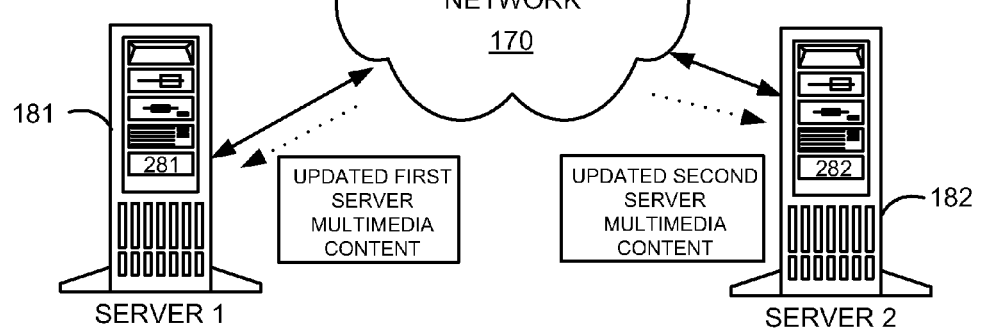

In some embodiments, the server multimedia content exportation module 568 is configured to receive a trigger. The trigger is activated by a user clicking or selecting the publish button 718 on the menu 710 of the user interface 700, illustrated in FIG. 16A. The trigger may indicate that the exporting of the updated first server multimedia content to the first server 181 and/or the updated second server multimedia content to the second server 182 should begin. Responsive to server multimedia content exportation module 568 receiving the trigger, the updated first server multimedia content and/or the updated second server multimedia content is exported as illustrated in the nonlimiting embodiment in FIG. 16B.

Once exported to the first server 181, the updated first server multimedia content will replace the first server multimedia content 281 and become a revised first server multimedia content 381. Also, the updated second server multimedia content will replace the second server multimedia content 282 and become a revised second server multimedia content 382.

In some embodiments, the optical disc 141 is not rewriteable, which causes the instructional content 241c on the optical disc 141 to not be updateable. The first server multimedia content 281 may still be updated, but because the instructional content 241c cannot be updated, the revised first server multimedia content 381 must be exported to and stored at the same location on the first server 181 where the first server multimedia content 281 was stored. Hence, though not updated, the first association content 341d will, in effect, include an association between the first server 181 and the revised first server multimedia content 381.

When the optical disc 141 is played by an optical disc player 412, the revised instructional content 341c (which was not updated) of the revised multimedia content 300 will cause the optical disc player 412 to download the revised first server multimedia content 381 which is stored at the location on the first server 181 where the first server multimedia content 281 was stored.

In some embodiments, updated first server multimedia content cannot be written over the first server multimedia content 281 or stored at the same location on the first server 181 where the first server multimedia content 281 was stored. In these embodiments, the updated first server multimedia content is exported to the first server 181 and stored as a revised first server multimedia content 381 at a location on the first server 181 that is different from the location of the first server multimedia content 281. Further, the instructional content 241c is updated to replace the location of the first server multimedia content 281 with the location of the revised first server multimedia content 381. If the optical disc 141 is rewriteable, the updated instructional content is burned onto the optical disc 141, and the revised first server multimedia content 381 will be retrieved by the optical disc player 412 when the rewritten optical disc 141 is played.

In some embodiments, the application specific software 560 may also include a conversion module 569. The conversion module 569 is configured to convert and/or process the optical disc multimedia content 241, the first server multimedia content 281, the second server multimedia content 282, updated optical disc multimedia content, the updated first server multimedia content, and/or the updated second server multimedia content. For example, the conversion module 569 is configured to convert the updated optical disc multimedia content into a optical disc multimedia bitstream and/or the conversion module 569 may convert the updated first server multimedia content into a server multimedia bitstream. The conversion module 569 is configured to convert and/or process the updated optical disc multimedia content before the updated optical disc multimedia content is burned or embedded. The conversion module 569 is configured to convert and/or process the updated first server multimedia content and/or the updated second server multimedia content before the updated first server multimedia content and/or the updated second server multimedia content is exported. Also, the conversion module 569 is configured to convert and/or process the first server multimedia content 281, the second server multimedia content 282 and/or the optical disc multimedia content 241 prior to importation.

A multimedia stream is, for example, any type of file, data stream, or digital broadcast representing any combination of audio, video, data, text, pictures, etc. The above exemplary data streams are merely examples, and it is intended that the system cover any type of multimedia bitstream in its broadest sense.

Figure 6:
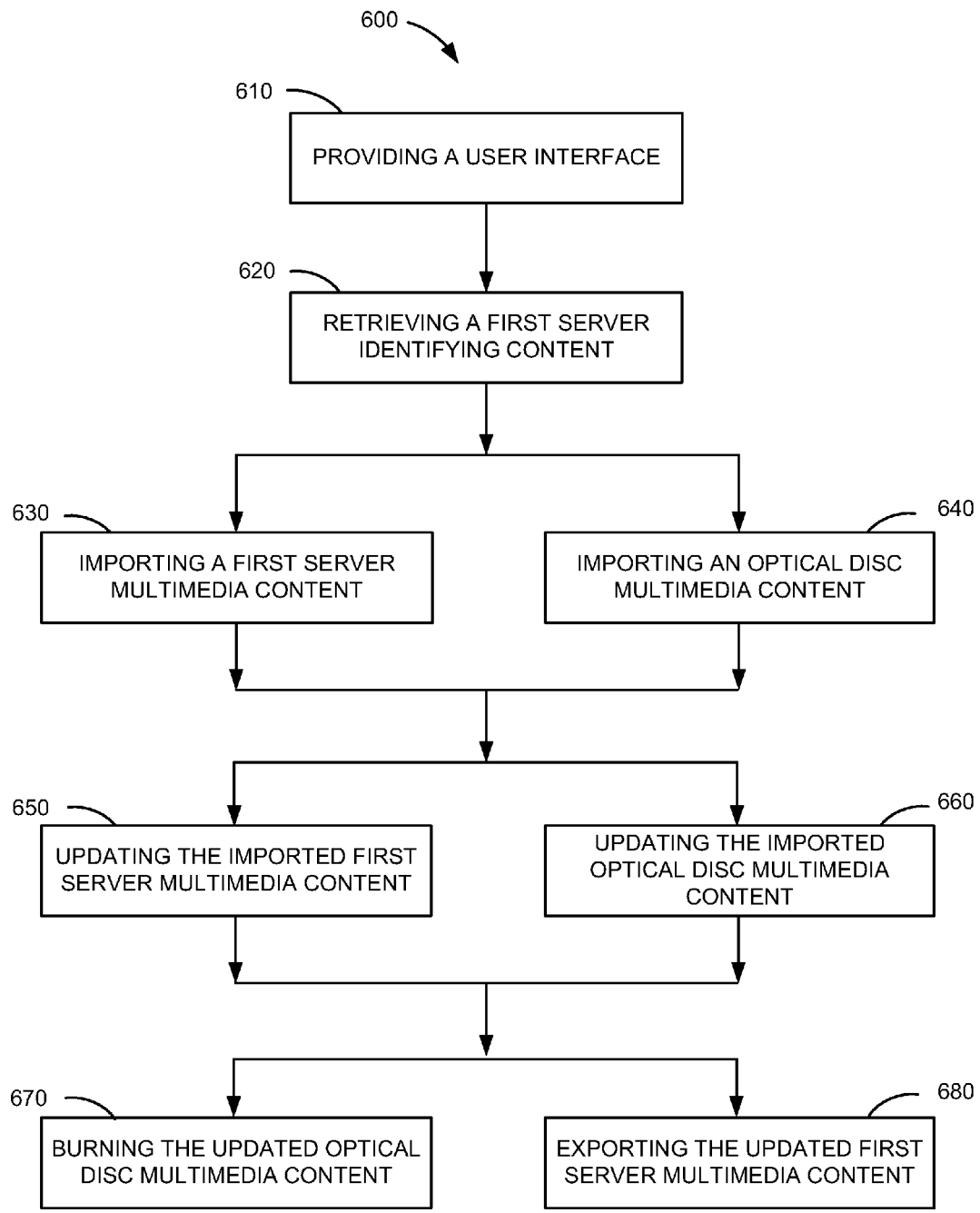
FIG. 6 illustrates a flow chart of an embodiment of a method for revising multimedia content.

FIG. 6 illustrates a nonlimiting example of a method 600 for revising a multimedia content including blocks 610, 620, 630, 640, 650, 660, 670, and/or 680. In block 610, a user interface is provided. For example, the user interface 700 is provided on a display such as the display 114 of the personal computer 110 illustrated in FIG. 7. FIGS. 8, 9A, 9B, 10A, 10B, 11A, 11B, 12A, 12B, 13A, 13B, 14, 15, 16A, 17A and 18A also illustrate nonlimiting examples of a user interface 700, which include a menu 710 and a workspace 720. The user interface 700 may be used in a variety of ways by a user or an editor. For example, the user interface 700 is used to revise the previously-authored multimedia content 200 resulting in a revised multimedia content 300, which will be discussed in further detail.

In block 620, a first association content 241d is read or retrieved from an optical disc. For example, the optical disc multimedia content 241 is read from the optical disc 141 using the optical disc drive 140 illustrated in FIGS. 1A and 1B. The optical disc multimedia content 241, which is read, is previously-authored and includes an instructional content 241c, which includes the first association content 241d, as illustrated in FIGS. 2A and 2B. In some embodiments, at least a portion of the optical disc multimedia content 241, which is read from the optical disc 141, is displayed in the user interface 700 on the display 114 of the personal computer 110 as illustrated in FIG. 8. In FIG. 8, the portion of the optical disc multimedia content 241, which is read and displayed, includes an optical disc video content 241b and the first association content 241d. The first association content 241d includes a hyperlink or URL to the first server 181.

In block 630, a first server multimedia content 281 is imported. The first server multimedia content 281 is imported from the first server 181 over the network 170 according to the read first association content 241d. In some embodiments, the second server multimedia content 282 is imported from the second server 182 as well. FIG. 9A illustrates a nonlimiting example of a user interface 700 displaying an imported first multimedia content 281. Specifically, a first server multimedia content 281 (including instructional content 281c and a audio/visual clip 2 and audio/visual clip 3 of optical disc video content 241b) are imported and represented on the user interface 700.

In some embodiments, importing the first server multimedia content 281 includes building a connection between the computing device 112 and the first server 181 based on the instructional content 241c on the optical disc 141. For example, the instructional content 241c includes instructions for building a connection with the first server 181 based on a first association content 241d, which includes a connection string according to a communications protocol. Further, the instructional content 241c includes instructions for defining a transmitting behavior for the first server 181 corresponding to the first server multimedia content 281. Further, the instructions for retrieving the first server multimedia content 281 from the first server 181 is via the built connection. A nonlimiting example of the instructions in BD-J code is shown provided above with respect to FIGS. 4A, 4B, and 4C.

In some embodiments, a directive is received triggering the importation of the first server multimedia content 281. For example, a click or selection of the hyperlink and/or the import button 712 on the user interface 700 depicted in FIG. 8 may cause the first server multimedia content 281 to be imported from the first server 181. As another example (not illustrated), a user may select an import button 712 on the menu 710 of the user interface 700, and a list of servers storing server multimedia content is displayed on the user interface 700. The user may select (from the displayed list) a server from which to import a server multimedia content. As yet another example (not illustrated), the first server multimedia content 281 is imported in response to the instructional content 241c of the optical disc 141 being read.

In block 640, the optical disc multimedia content is imported. For example, the optical disc server multimedia content 241 is imported from the optical disc 141 using the optical disc drive 140. In some embodiments, a directive is received triggering the importing of the optical disc multimedia content 241. Further, in some embodiments, the directive to initiate the importing is received on the user interface 700. For example, a click or selection of the import button 712 on the user interface 700 depicted in FIG. 8 causes the optical disc multimedia content 241 to be imported from the optical disc 141. As yet another example (not illustrated), the importing of the optical disc multimedia content 241 begins in response to the reading of the optical disc multimedia content 241 from the optical disc 141 according to block 620.

Also, those reasonably skilled in the art will understand that block 630 and block 640 may be executed in an order different from the order illustrated in FIG. 6. For example, in another embodiment, the importing of the optical disc multimedia content in block 640 may be executed before the importing of the first server multimedia content in block 630.

In block 650, the imported first server multimedia content is updated. For example, the imported first server multimedia content 281 is updated, which results in a revised first server multimedia content 381, once exported. Further, in some embodiments, the imported second server multimedia content 282 is also updated, which results in a revised second server multimedia content 382, once exported.

In some embodiments, edits associated with the first server multimedia content 281 are received. Further, in some embodiments, these edits are received on the user interface 700. The edits may include, but are not limited to, adjusting contrast, color, volume, speed, length as well as cropping, rotating and/or adding additional content. The imported first server multimedia content 281 is modified in accordance with the received edits to update the imported first server multimedia content 281. Consequently, the updated first server multimedia content includes the modified first server multimedia content 281.

For example, as shown in the user interface 700 illustrated in FIG. 9A, the source content (including audio/visual clip 5 and audio/visual clip 6), first server multimedia content 281 and the optical disc multimedia content 241 have been imported. The imported first server multimedia content 281 is edited by adding at least a portion of the imported source content. Specifically, FIG. 9B illustrates that audio/visual clip 5 of the imported source content has been added to the imported first server multimedia content 281 and yields the updated first server multimedia content.

In some embodiments, the imported first server multimedia content 281 is updated by importing a source content and replacing at least a portion of the imported first server multimedia content 281 with at least a portion of the imported source content. As discussed above regarding FIGS. 1A and 1B, the imported source content may include audio content, video content, interactive content, instructional content, metadata content and/or one or more of a variety of other source content. For example, as shown in the user interface 700 illustrated in FIG. 10A, the source content (including the audio/visual clip 5 and the audio/visual clip 6), the first server multimedia content 281 and the optical disc multimedia content 241 have been imported. In FIG. 10B, the imported first server multimedia content 281 is updated by having at least a portion of the imported source content replace the imported first server multimedia content 281. Specifically, FIG. 10B illustrates that audio/visual clip 6, which is a portion of the imported source content, has replaced audio/visual clip 2 and audio/visual clip 3 of the imported first server multimedia content 281 and yields the updated first server multimedia content including the audio/visual clip 6.

In some embodiments, metadata content and/or interactive content is inserted into the imported first server multimedia content 281 and/or the imported second server multimedia content 282. For example, FIG. 11A illustrates an imported first server multimedia content 281 on a user interface 700 and a metadata content 281f being inserted (according to a user's instructions) into the imported first server multimedia content 281. The metadata content 281f being inserted includes shapes 1004, subtitles 1006, and custom subtitles 1012, and in other embodiments, other metadata content is inserted. FIG. 11B shows the updated first server multimedia content including the inserted metadata content 381f. As another example, FIG. 12A illustrates an imported first server multimedia content 281 on a user interface 700 and an interactive content 281g being inserted into the imported first server multimedia content 281. The interactive content 281g being inserted includes a menu 1008. A viewer using the video playback device 400 may use the menu 1008 to select scenes, commentary, subtitles, etc. FIG. 12B shows the updated first server multimedia content including the inserted interactive content 381g.

As another example, FIGS. 13A and 13B each display a representation of the previously-authored multimedia content 200 based on the optical disc multimedia content 241 imported from the optical disc 141 and the first server multimedia content 281 imported from the first server 181. In FIG. 13A, the previously-authored multimedia content 200 is represented as a timeline 800A, and in FIG. 13B, the previously-authored multimedia content 200 is represented as a storyboard 800B including thumbnails representing audio/visual clips. In FIGS. 13A and 13B, audio/visual clip 5 is added to the previously-authored multimedia content 200 represented as a timeline 800A or a storyboard 800B, respectively. In some embodiments, audio/visual clip 6 is also added to the previously-authored multimedia content 200 represented as a timeline 800A or a storyboard 800B, but the audio/visual clip 6 may be added to the imported second server multimedia content 282 instead of the imported first server multimedia content 281.

In block 660, the imported optical disc multimedia content is updated. In some embodiments, at least a portion of the imported optical disc multimedia content 241 is updated, which results in an updated optical disc multimedia content. In some embodiments, only the instructional content 241c is updated. In fact, in some embodiments, only the first association content 241d is updated.

Also, those reasonably skilled in the art will understand that block 650 and block 660 may be executed in an order different from the order illustrated in FIG. 6. For example, in another embodiment, the update of the optical disc multimedia content in block 660 may be executed before the update of the first server multimedia content in block 650.

For example, the imported instructional content 241c is replaced or edited with instructional content generated, created or imported using the user interface 700. As another example, a first association content 241d and/or a second association content is replaced with an updated first association content 241d and/or an updated second association content 242d. In some embodiments, a second association content 242d is generated when a first server multimedia content 281, which may have been updated, is destined for (e.g., will be exported to) a second server 182. Hence, the second association content 242d includes an association between the updated first server multimedia content and the second server 182.

FIG. 15 illustrates a diagram of the user interface 700 showing the selection of a destination for each of the imported audio/visual clips, which were included in the imported source content. For example, a user may select a server as associated with a particular content by dragging a clip to a destination on the provided user interface 700. Selecting the destination for the imported source content is useful where the imported source content is added to a representation of the previously-authored multimedia content 200 instead of a representation of the first server multimedia content 281. In FIG. 15, audio/visual clip 5 is selected as being destined for the first server 181, and audio/visual clip 6 is selected as being destined for the second server 182.

In some embodiments, the relation content 241e of the instructional content 241c of the optical disc multimedia content 241 is updated according to edits received regarding the timeline 800A or storyboard 800B. For example, with regard to the example illustrated in FIGS. 9B, 13A and 13B, the relation content 241e is updated to include a relation between audio/visual clip 1, which is included in the optical disc multimedia content 241, and audio/visual clip 5, which will be included in the revised first server multimedia content 381, once the updated first server multimedia content is exported to the first server 181. In FIG. 15, audio/visual clip 5 is selected as being destined for the first server 181, and audio/visual clip 6 is selected as being destined for the second server 182.

In block 670, the updated optical disc multimedia content is burned onto an optical disc 141. As a result, the optical disc 141 stores the revised optical disc multimedia content 341. In some embodiments, the updated optical disc multimedia content is burned on the optical disc responsive to the receipt of a trigger. The trigger is activated by a user clicking or selecting the publish button 718 on the menu 710 of the user interface 700 as illustrated in FIG. 17A.

In some embodiments, block 680 may further include determining whether the optical disc 141, which was read by the optical disc drive 140, is capable of having the updated optical disc multimedia content burned onto it. If the optical disc 141 is capable (e.g., writeable) of having the updated optical disc multimedia content burned onto it, then the updated optical disc multimedia content is burned or embedded onto the optical disc 141 as illustrated in FIG. 17B.

Also, those reasonably skilled in the art will understand that block 680 and block 670 may be executed in an order different from the order illustrated in FIG. 6. For example, in another embodiment, the exporting of the updated first server multimedia content in block 680 could be executed before the burning of the optical disc multimedia content in block 670.

In some embodiments, if the optical disc 141 is not capable (e.g., writeable) of having the updated optical disc multimedia content burned onto it, then a message is provided on the user interface 700 indicating that the updated optical disc multimedia content cannot be burned onto the optical disc 141 and/or that a writeable optical disc 142 must be inserted in the optical disc drive 140. For example, the user interface 700 illustrated in FIG. 18A shows a message 1800 indicating that a writeable optical disc 142 should be inserted in the optical disc drive 140. In some embodiments, the updated optical disc multimedia content is burned or embedded onto the writeable optical disc 142 responsive to a writeable optical disc 142 being inserted in the optical disc drive 140.

In block 680, the updated first server multimedia content is exported. In some embodiments, the updated first server multimedia content is exported to the first server 181 for storage as a revised first server multimedia content 381. The updated first server multimedia content is exported according to the first association content 241*d*. In some embodiments, such as the one illustrated in FIG. 15, an updated second server multimedia content is exported to the second server 182 as well.

Also, in some embodiments, the updated first server multimedia content is exported to the second server 182 for storage as a revised second server multimedia content 382. In these embodiments, a second association content 342*d* is generated when the optical disc multimedia content is updated in block 670, which will be discussed further below. In this case, block 670 would be performed prior to block 650. The generated second association content 342*d* includes an association between the updated first server multimedia content and the second server 182. In this case, the updated first server multimedia content is exported to the second server 182 according to the generated second association content 342*d*.

Also, in some embodiments, a trigger is received. The trigger is activated by a user clicking or selecting the publish button 718 on the menu 710 of the user interface 700, illustrated in FIG. 15. The trigger indicates that the exporting of the updated first server multimedia content to the first server 181 and/or the updated second server multimedia content to the second server 182 should begin. Responsive to receiving the trigger, the updated first server multimedia content and the updated second server multimedia content is exported to the first server 181 and second server 182, respectively. As a result, the first server 181 stores a revised first server multimedia content 381, and the second server 182 stores a revised second server multimedia content 382.

In some embodiments, responsive to a determination that the optical disc 141 is not rewriteable in block 670, the previously-authored multimedia content 200 is updated by exporting the updated first server multimedia content to the same location on the first server 181 where the first server multimedia content 281 was stored. Hence, though not updated, the first association content 341*d* will, in effect, include an association between the first server 181 and the revised first server multimedia content 381. When the optical disc 141 is played by an optical disc player 412, the revised instructional content 341*c* (which was not updated) of the revised multimedia content 300 will cause the optical disc player 412 to download the revised first server multimedia content 381 which is stored at the location on the first server 181 where the first server multimedia content 281 was stored.

In some embodiments, updated first server multimedia content cannot be written over the first server multimedia content 281 or stored at the same location on the first server 181 where the first server multimedia content 281 was stored. In these embodiments, the updated first server multimedia content is exported to the first server 181 and stored as a revised first server multimedia content 381 at a location on the first server 181 that is different from the location of the first server multimedia content 281. Further, the instructional content 241*c* is updated to replace the location of the first server multimedia content 281 with the location of the revised first server multimedia content 381. If the optical disc 141 is rewriteable, the updated instructional content is burned onto the optical disc 141 in block 660, and the revised first server multimedia content 381 will be retrieved by the optical disc player 412 when the rewritten optical disc 141 is played.

In some embodiments, the method 600 may further include converting and/or processing the updated optical disc multimedia content, the updated first server multimedia content, and/or the updated second server multimedia content. For example, the updated optical disc multimedia content is converted into a multimedia bitstream and/or the updated first server multimedia content is converted into or from a multimedia bitstream.

Any process descriptions or blocks in flow charts should be understood as representing modules, segments, or portions of code which include one or more executable instructions for implementing specific logical functions or steps in the process, and alternate implementations are included within the scope of the embodiments described in the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments in the present disclosure are merely possible examples of implementations, merely set forth for a clear understanding of the principles of the disclosure. Many variations and modifications are made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A computer readable medium comprising instructions for revising a multimedia content, the multimedia content including a first server multimedia content and an optical disc multimedia content, the instructions being executable by a computer that control the computer to perform:

retrieving, using an optical disc drive, a first association content included in an instructional content stored on an optical disc, wherein the optical disc multimedia content includes the instructional content;

importing the first server multimedia content from a first server according to the retrieved first association content, wherein the first server multimedia content is a previously-authored content;

updating the first server multimedia content; and exporting the updated first server multimedia content.

2. The computer readable medium of claim 1, wherein the exporting of the updated first server multimedia content is according to the first association content, and wherein the exporting of the updated first server multimedia content is to a first server for storage as a revised first server multimedia content.

3. The computer readable medium of claim 1, further comprising instructions being executable by a computer that control the computer to perform:

generating a second association content, and wherein the exporting of the updated first server multimedia content is to a second server for storage as a second server multimedia content, wherein the exporting of the updated first server multimedia content is according to the generated second association content, wherein the generated second association content includes an association between the updated first server multimedia content and the second server.

4. The computer readable medium of claim 3, further comprising instructions being executable by a computer that control the computer to perform burning the second association content onto the optical disc.

5. The computer readable medium of claim 1, wherein the updating the first server multimedia content further comprises:
receiving edits associated with the first server multimedia content; and
modifying the first server multimedia content in accordance with the received edits to update the first server multimedia content, the updated first server multimedia content including the modified first server multimedia content.

6. The computer readable medium of claim 1, wherein the updating the first server multimedia content further comprises:
modifying the first server multimedia content, the updated first server multimedia content including the modified first server multimedia content; and
updating the instructional content by replacing the first association content in the instructional content with a second association content, wherein the second association content includes an association between the updated first server multimedia content and a second server, and
wherein the exporting of the updated first server multimedia content is to the second server for storage as a second server multimedia content.

7. The computer readable medium of claim 1, wherein the updating the first server multimedia content further comprises:
importing a source content; and
replacing at least a portion of the first server multimedia content with at least a portion of the imported source content, the updated first server multimedia content including the at least a portion of the imported source content.

8. The computer readable medium of claim 1, wherein the instructional content includes a script that controls a configuration of the first server or a transmitting behavior of the first server.

9. The computer readable medium of claim 1, wherein the instructional content includes a server universal resource locator (URL), a server protocol, a clip attribute, a code, or a script.

10. The computer readable medium of claim 1, wherein the instructional content includes a script that controls an effect corresponding to at least a portion of the first server multimedia content.

11. The computer readable medium of claim 1, further comprising instructions being executable by a computer that control the computer to perform:
importing the optical disc multimedia content from an optical disc, wherein the optical disc multimedia content is a previously-authored content;
updating the imported optical disc multimedia content;
exporting the updated optical disc multimedia content to a second server;
generating a second server association content; and
burning the second server association content onto the optical disc.

12. The computer readable medium of claim 1, wherein the instructional content comprises instructions for controlling an optical disc player to:
build a connection with the first server based on a connection string according to a communications protocol;
define a transmitting behavior for the first server corresponding to at least a portion of the first server multimedia content identified in the connection string; and
retrieve the at least a portion of the first server multimedia content from the first server via the built connection.

13. A method for revising a multimedia content, the multimedia content including a first server multimedia content and an optical disc multimedia content, the optical disc multimedia content including an instructional content, the method comprising:
retrieving a first association content from the instructional content stored on an optical disc;
importing the first server multimedia content from a first server according to the retrieved first association content;
updating the first server multimedia content; and
exporting the updated first server multimedia content to the first server.

14. The method of claim 13, further comprising:
building a connection with the first server based on the retrieved first association content.

15. The method of claim 13, further comprising:
reading an optical disc multimedia content on a first optical disc inserted in the optical disc reader, wherein the optical disc multimedia content is a previously-authored content;
updating the imported optical disc multimedia content;
exporting the updated optical disc multimedia content to a second server;
generating a second server association content; and
burning the second server association content onto the optical disc.

16. The method of claim 13, wherein the updating the first server multimedia content further comprises:
receiving edits associated with the first server multimedia content; and
modifying the first server multimedia content in accordance with the received edits to update the first server multimedia content, the updated first server multimedia content including the modified first server multimedia content.

17. The method of claim 13, wherein the updating the first server multimedia content further comprises:
modifying the first server multimedia content, the updated first server multimedia content including the modified first server multimedia content; and
updating the instructional content by replacing the first association content in the instructional content with a second association content, wherein the second association content includes an association between the updated first server multimedia content and a second server, and
wherein the exporting of the updated first server multimedia content is to the second server for storage as a second server multimedia content.

18. The method of claim 13, further comprising determining whether the optical disc is capable of being modified.

19. The method of claim 18, further comprising exporting the updated first server multimedia content to the first server for storage at the location on the first server where the first server multimedia content is stored, responsive to a determination that the optical disc is not capable of being modified.

20. The method of claim 13, further comprising:
importing a source content; and
replacing at least a portion of the first server multimedia content with at least a portion of the imported source content, the updated first server multimedia content including the at least a portion of the imported source content.

* * * * *